(12) United States Patent
Anzures et al.

(10) Patent No.: US 8,736,561 B2
(45) Date of Patent: May 27, 2014

(54) DEVICE, METHOD, AND GRAPHICAL USER INTERFACE WITH CONTENT DISPLAY MODES AND DISPLAY ROTATION HEURISTICS

(75) Inventors: Freddy Allen Anzures, San Francisco, CA (US); Stephen O. Lemay, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 531 days.

(21) Appl. No.: 12/789,427

(22) Filed: May 27, 2010

(65) Prior Publication Data

US 2011/0163969 A1    Jul. 7, 2011

Related U.S. Application Data

(60) Provisional application No. 61/335,518, filed on Jan. 6, 2010.

(51) Int. Cl.
*G06F 3/041* (2006.01)

(52) U.S. Cl.
USPC .......................................... 345/173

(58) Field of Classification Search
USPC ................................ 345/173–181
See application file for complete search history.

(56) References Cited

U.S. PATENT DOCUMENTS

| | | |
|---|---|---|
| 4,313,108 A | 1/1982 | Yoshida |
| 5,146,556 A | 9/1992 | Hullot et al. |
| 5,303,388 A | 4/1994 | Kreitman et al. |
| 5,345,543 A | 9/1994 | Capps et al. |
| 5,396,590 A | 3/1995 | Kreegar |
| 5,446,882 A | 8/1995 | Capps et al. |
| 5,452,414 A | 9/1995 | Rosendahl et al. |
| 5,463,725 A | 10/1995 | Henckel et al. |
| 5,541,697 A | 7/1996 | McIntyre |
| 5,570,109 A | 10/1996 | Jenson |
| 5,610,653 A | 3/1997 | Abecassis ................ 348/110 |
| 5,644,739 A | 7/1997 | Moursund |
| 5,659,805 A | 8/1997 | Furlani et al. |
| 5,757,371 A | 5/1998 | Oran et al. |

(Continued)

FOREIGN PATENT DOCUMENTS

| | | |
|---|---|---|
| EP | 0 651 544 A2 | 6/1995 |
| EP | 0 701 220 A1 | 3/1996 |

(Continued)

OTHER PUBLICATIONS palmOne, "Your Mobile Manager," Chapter 2, LifeDrive™ User's Guide, © 2005 palmOne, 23 pages, http//www.palm.com/us/support/handbooks/lifedrive/en/lifedrive_handbook.pdf.

(Continued)

*Primary Examiner* — Christopher E Leiby
(74) *Attorney, Agent, or Firm* — Morrison & Foerster LLP

(57) ABSTRACT

A method is performed at a multifunction device with a touch-sensitive display. The method includes: playing a first piece of content in a full-size mode on the display at a predefined aspect ratio; while playing the first piece of content on the display in the full-size mode, detecting a first gesture on the display; in response to detecting the first gesture: shrinking the playing of the first piece of content to a first region of the display while keeping the predefined aspect ratio and displaying information related to the first piece of content in a second region of the display.

27 Claims, 28 Drawing Sheets

(56) References Cited

U.S. PATENT DOCUMENTS

| | | | |
|---|---|---|---|
| 5,760,773 A | 6/1998 | Berman et al. ............... 345/347 |
| 5,825,357 A | 10/1998 | Malamud et al. |
| 5,838,326 A | 11/1998 | Card et al. |
| 5,864,868 A | 1/1999 | Contois |
| 5,880,733 A | 3/1999 | Horvitz et al. |
| 5,896,133 A | 4/1999 | Lynch et al. |
| 5,900,909 A | 5/1999 | Parulski et al. |
| 6,006,227 A | 12/1999 | Freeman et al. |
| 6,011,585 A | 1/2000 | Anderson |
| 6,023,275 A | 2/2000 | Horvitz et al. |
| 6,040,824 A | 3/2000 | Maekawa et al. |
| 6,072,486 A | 6/2000 | Sheldon et al. |
| 6,073,036 A | 6/2000 | Heikkinen et al. |
| 6,133,916 A | 10/2000 | Bukszar et al. |
| 6,177,936 B1 | 1/2001 | Cragun |
| 6,199,082 B1 | 3/2001 | Ferrel et al. |
| 6,297,795 B1 | 10/2001 | Kato et al. |
| 6,326,970 B1 | 12/2001 | Mott et al. |
| 6,346,951 B1 | 2/2002 | Mastronardi |
| 6,349,410 B1 | 2/2002 | Lortz |
| 6,359,615 B1 | 3/2002 | Singh |
| 6,388,877 B1 | 5/2002 | Canova, Jr. et al. |
| 6,411,283 B1 | 6/2002 | Murphy |
| 6,466,198 B1 | 10/2002 | Feinstein |
| 6,466,203 B2 | 10/2002 | Van Ee |
| 6,486,895 B1 | 11/2002 | Robertson et al. |
| 6,489,951 B1 | 12/2002 | Wong et al. |
| 6,496,182 B1 | 12/2002 | Wong et al. ............... 345/173 |
| 6,545,669 B1 | 4/2003 | Kinawi et al. |
| 6,570,583 B1 | 5/2003 | Kung et al. |
| 6,577,330 B1 | 6/2003 | Tsuda et al. |
| 6,590,568 B1 | 7/2003 | Astala et al. ............... 345/173 |
| 6,638,313 B1 | 10/2003 | Freeman et al. |
| 6,639,584 B1 | 10/2003 | Li |
| 6,724,403 B1 | 4/2004 | Santoro et al. |
| 6,725,427 B2 | 4/2004 | Freeman et al. |
| 6,768,999 B2 | 7/2004 | Prager et al. |
| 6,771,250 B1 | 8/2004 | Oh |
| 6,781,575 B1 | 8/2004 | Hawkins et al. |
| 6,919,879 B2 | 7/2005 | Griffin et al. |
| 6,928,461 B2 | 8/2005 | Tuli |
| 6,956,564 B1 | 10/2005 | Williams |
| 6,975,306 B2 | 12/2005 | Hinckley et al. |
| 7,030,861 B1 | 4/2006 | Westerman et al. |
| 7,054,965 B2 | 5/2006 | Bell et al. |
| 7,075,512 B1 | 7/2006 | Fabre et al. |
| 7,085,590 B2 | 8/2006 | Kennedy et al. |
| 7,149,549 B1 | 12/2006 | Ortiz et al. |
| 7,166,791 B2 | 1/2007 | Robbin et al. |
| 7,171,625 B1 | 1/2007 | Sacchi |
| 7,461,353 B2 | 12/2008 | Rohrbaugh et al. |
| 7,479,949 B2 | 1/2009 | Jobs et al. ............... 345/173 |
| 7,480,870 B2 | 1/2009 | Anzures et al. ............... 715/772 |
| 7,492,350 B2 | 2/2009 | Fabre et al. |
| 7,509,588 B2 | 3/2009 | van Os et al. ............... 715/835 |
| 7,581,186 B2 | 8/2009 | Dowdy et al. |
| 7,587,671 B2 | 9/2009 | Saft et al. ............... 715/253 |
| 7,596,761 B2 | 9/2009 | Lemay et al. ............... 715/779 |
| 7,656,393 B2 | 2/2010 | King et al. |
| 7,676,767 B2 | 3/2010 | Hofmeister et al. |
| 7,679,604 B2 | 3/2010 | Uhlik et al. |
| 7,710,393 B2 | 5/2010 | Tsuk et al. |
| 7,739,271 B2 | 6/2010 | Cook et al. |
| 7,783,990 B2 | 8/2010 | Amadio et al. |
| 7,788,583 B1 | 8/2010 | Amzallag et al. |
| 7,831,926 B2 | 11/2010 | Rohrbaugh et al. |
| 7,844,889 B2 | 11/2010 | Rohrbaugh et al. |
| 7,996,792 B2 | 8/2011 | Anzures et al. |
| 8,155,505 B2 * | 4/2012 | Lemay et al. ............... 386/281 |
| 2001/0015719 A1 | 8/2001 | Van Ee et al. |
| 2001/0024195 A1 | 9/2001 | Hayakawa |
| 2001/0050687 A1 | 12/2001 | Iida et al. |
| 2002/0015064 A1 | 2/2002 | Robotham et al. |
| 2002/0021278 A1 | 2/2002 | Hinckley et al. |
| 2002/0030699 A1 | 3/2002 | Van Ee |
| 2002/0085037 A1 | 7/2002 | Leavitt et al. |
| 2002/0093531 A1 | 7/2002 | Barile ............... 345/753 |
| 2002/0113824 A1 | 8/2002 | Myers, Jr. |
| 2002/0152283 A1 | 10/2002 | Dutta et al. |
| 2002/0198909 A1 | 12/2002 | Huynh et al. |
| 2003/0013483 A1 | 1/2003 | Ausems et al. |
| 2003/0025676 A1 | 2/2003 | Cappendijk ............... 345/173 |
| 2003/0033331 A1 | 2/2003 | Sena et al. |
| 2003/0063125 A1 | 4/2003 | Miyajima et al. |
| 2003/0095135 A1 | 5/2003 | Kaasila et al. |
| 2003/0095155 A1 | 5/2003 | Johnson |
| 2003/0117427 A1 | 6/2003 | Haughawout et al. |
| 2003/0122787 A1 | 7/2003 | Zimmerman et al. |
| 2003/0164861 A1 | 9/2003 | Barbanson et al. |
| 2004/0013416 A1 | 1/2004 | Mok |
| 2004/0027396 A1 | 2/2004 | Lection |
| 2004/0055446 A1 | 3/2004 | Robbin et al. |
| 2004/0100479 A1 | 5/2004 | Nakano et al. |
| 2004/0122683 A1 | 6/2004 | Grossman et al. |
| 2004/0143590 A1 * | 7/2004 | Wong et al. ............... 707/102 |
| 2004/0143796 A1 | 7/2004 | Lerner et al. |
| 2004/0167783 A1 | 8/2004 | Nagai |
| 2004/0169674 A1 | 9/2004 | Linjama |
| 2004/0201595 A1 | 10/2004 | Manchester |
| 2004/0215534 A1 | 10/2004 | Gautier et al. |
| 2004/0235520 A1 | 11/2004 | Cadiz et al. |
| 2004/0250217 A1 | 12/2004 | Tojo et al. |
| 2004/0268400 A1 | 12/2004 | Barde et al. |
| 2005/0005246 A1 | 1/2005 | Card et al. |
| 2005/0012723 A1 | 1/2005 | Pallakoff |
| 2005/0020317 A1 | 1/2005 | Koyama ............... 455/566 |
| 2005/0024341 A1 | 2/2005 | Gillespie et al. |
| 2005/0026644 A1 | 2/2005 | Lien |
| 2005/0044509 A1 | 2/2005 | Hunleth et al. ............... 715/834 |
| 2005/0057524 A1 | 3/2005 | Hill et al. |
| 2005/0071736 A1 | 3/2005 | Schneider et al. ............... 715/500 |
| 2005/0071778 A1 | 3/2005 | Tokkonen |
| 2005/0079896 A1 | 4/2005 | Kokko et al. |
| 2005/0091596 A1 | 4/2005 | Anthony et al. |
| 2005/0093826 A1 | 5/2005 | Huh |
| 2005/0110768 A1 | 5/2005 | Marriott |
| 2005/0166232 A1 | 7/2005 | Lamkin et al. |
| 2005/0177783 A1 | 8/2005 | Agrawala et al. |
| 2005/0183017 A1 | 8/2005 | Cain |
| 2005/0204385 A1 | 9/2005 | Sull et al. ............... 715/45 |
| 2005/0229118 A1 | 10/2005 | Chiu et al. |
| 2005/0240494 A1 | 10/2005 | Cue et al. |
| 2005/0240756 A1 | 10/2005 | Mayer |
| 2005/0243069 A1 | 11/2005 | Yorio et al. |
| 2005/0251755 A1 | 11/2005 | Mullins et al. |
| 2005/0270276 A1 | 12/2005 | Sugimoto et al. |
| 2005/0283729 A1 | 12/2005 | Morris et al. |
| 2005/0285880 A1 | 12/2005 | Lai et al. |
| 2006/0017692 A1 | 1/2006 | Wehrenberg et al. |
| 2006/0026521 A1 | 2/2006 | Hotelling et al. ............... 715/702 |
| 2006/0026535 A1 | 2/2006 | Hotelling et al. |
| 2006/0033761 A1 | 2/2006 | Suen et al. |
| 2006/0053387 A1 | 3/2006 | Ording |
| 2006/0064647 A1 | 3/2006 | Tapuska et al. |
| 2006/0080616 A1 | 4/2006 | Vogel et al. |
| 2006/0085743 A1 | 4/2006 | Baudisch et al. |
| 2006/0097991 A1 | 5/2006 | Hotelling et al. |
| 2006/0101354 A1 | 5/2006 | Hashimoto et al. |
| 2006/0132460 A1 | 6/2006 | Kolmykov-Zotov et al. |
| 2006/0143574 A1 | 6/2006 | Ito et al. |
| 2006/0146016 A1 | 7/2006 | Chan et al. |
| 2006/0146038 A1 | 7/2006 | Park et al. |
| 2006/0195789 A1 | 8/2006 | Rogers et al. |
| 2006/0195790 A1 | 8/2006 | Beaupre et al. |
| 2006/0197753 A1 | 9/2006 | Hotelling |
| 2006/0246955 A1 | 11/2006 | Nirhamo et al. |
| 2006/0265643 A1 * | 11/2006 | Saft et al. ............... 715/517 |
| 2006/0277588 A1 | 12/2006 | Harrington et al. |
| 2006/0278692 A1 | 12/2006 | Matsumoto et al. |
| 2007/0004451 A1 | 1/2007 | Anderson |
| 2007/0013665 A1 | 1/2007 | Vetelainen et al. |
| 2007/0024646 A1 | 2/2007 | Saarinen et al. ............... 345/660 |
| 2007/0033295 A1 | 2/2007 | Marriott |
| 2007/0038612 A1 | 2/2007 | Sull et al. |

(56) References Cited

U.S. PATENT DOCUMENTS

| | | |
|---|---|---|
| 2007/0044036 A1 | 2/2007 | Ishimura et al. |
| 2007/0053268 A1 | 3/2007 | Crandall et al. |
| 2007/0064619 A1 | 3/2007 | Bettis et al. |
| 2007/0067738 A1 | 3/2007 | Flynt et al. |
| 2007/0070066 A1 | 3/2007 | Bakhash |
| 2007/0085841 A1 | 4/2007 | Tsuk et al. |
| 2007/0106952 A1 | 5/2007 | Matas et al. ............... 715/764 |
| 2007/0124680 A1 | 5/2007 | Robbin et al. |
| 2007/0152984 A1 | 7/2007 | Ording et al. |
| 2007/0155434 A1 | 7/2007 | Jobs et al. |
| 2007/0156697 A1 | 7/2007 | Tsarkova |
| 2007/0157228 A1 | 7/2007 | Bayer et al. |
| 2007/0263176 A1 | 11/2007 | Nozaki et al. |
| 2007/0288860 A1 | 12/2007 | Ording et al. |
| 2008/0036743 A1 | 2/2008 | Westerman et al. |
| 2008/0042984 A1 | 2/2008 | Lim et al. |
| 2008/0055272 A1 | 3/2008 | Anzures et al. ............ 345/173 |
| 2008/0059888 A1 | 3/2008 | Dunko |
| 2008/0062137 A1 | 3/2008 | Brodersen et al. |
| 2008/0066016 A1 | 3/2008 | Dowdy et al. |
| 2008/0122796 A1 | 5/2008 | Jobs et al. |
| 2008/0165148 A1 | 7/2008 | Williamson et al. |
| 2008/0165152 A1 | 7/2008 | Forstall et al. ............. 345/173 |
| 2008/0165153 A1 | 7/2008 | Platzer et al. .............. 345/173 |
| 2008/0174570 A1 | 7/2008 | Jobs et al. .................. 345/173 |
| 2008/0231610 A1 | 9/2008 | Hotelling et al. |
| 2008/0320391 A1 | 12/2008 | Lemay et al. |
| 2009/0002335 A1 | 1/2009 | Chaudhri |
| 2009/0172532 A1 | 7/2009 | Chaudhri |
| 2009/0198359 A1 | 8/2009 | Chaudhri |
| 2009/0304359 A1* | 12/2009 | Lemay et al. ................ 386/96 |
| 2010/0029327 A1* | 2/2010 | Jee ............................ 455/556.1 |
| 2010/0103321 A1* | 4/2010 | Ishikawa et al. ............ 348/659 |
| 2011/0050640 A1* | 3/2011 | Lundback et al. .......... 345/175 |

FOREIGN PATENT DOCUMENTS

| | | | |
|---|---|---|---|
| EP | 1 049 305 A1 | 11/2000 | |
| EP | 1 517 228 A2 | 3/2005 | |
| EP | 1 632 874 A2 | 3/2006 | |
| EP | 1 752 880 A1 | 2/2007 | |
| GB | 2 347 593 A | 9/2000 | |
| JP | 11 143604 | 5/1999 | |
| JP | 2000 105772 | 4/2000 | |
| JP | 2000 181436 | 6/2000 | |
| JP | 2005 267049 | 9/2005 | |
| WO | WO 99/54807 A1 | 10/1999 | |
| WO | WO 00/08757 A | 2/2000 | ............... H06J 1/00 |
| WO | WO 01/23985 A1 | 4/2001 | |
| WO | WO 01/79980 A1 | 10/2001 | |
| WO | WO 02/46903 A1 | 6/2002 | |
| WO | WO 02/093542 A1 | 11/2002 | |
| WO | WO 03/052626 A1 | 6/2003 | |
| WO | WO 2004/021166 A1 | 3/2004 | |
| WO | WO 2004/040481 A1 | 5/2004 | |
| WO | WO 2005/029308 | 3/2005 | |
| WO | WO 2005/036416 A2 | 4/2005 | |
| WO | WO 2005/041020 | 5/2005 | ............. G06F 3/033 |
| WO | WO 2005/106684 A1 | 11/2005 | |
| WO | WO 2006/003591 A2 | 1/2006 | |
| WO | WO 2006/020304 A2 | 2/2006 | |
| WO | WO 2006/020305 A2 | 2/2006 | |
| WO | WO 2008/030874 A2 | 3/2008 | |
| WO | WO 2008/030976 A2 | 3/2008 | |
| WO | WO 2008/086303 A1 | 7/2008 | |

OTHER PUBLICATIONS

Tidwell, J., "Animated Transition," from Designing Interfaces, O'Reilly Media, Inc., Nov. 2005, pp. 84-85.

Williams, M., "LG's Cell Phone Can Pause Live TV," PC World, Oct. 11, 2005.

International Search Report and Written Opinion dated Feb. 19, 2008, received in International Application No. PCT/US2007/077638, which corresponds to U.S. Appl. No. 11/850,008.

Invitation to Pay Additional Fees dated Jun. 27, 2008, received in International Application No. PCT/US2008/050430, which corresponds to U.S. Appl. No. 11/969,809.

International Search Report and Written Opinion dated Sep. 1, 2008, received in International Application No. PCT/US2008/050430, which corresponds to U.S. Appl. No. 11/969,809.

Office Action dated Aug. 2, 2010, received in U.S. Appl. No. 11/850,008.

Office Action dated Oct. 15, 2010, received in U.S. Appl. No. 11/968,067.

Wikipedia, "History of YouTube," 2004-2009, downloaded Mar. 15, 2011, 4 pages, http://en.wikipedia.org/wiki/History_of_YouTube.

YouTube, "Broadcast Yourself," 2 pages, www.youtube.com, Nov. 1, 2005.

YouTube, "Broadcasting Ourselves;)," Nov. 15, 2005, 5 pages, http://youtube-global.blogspot.com/2005_11_01_archive.html.

International Search Report and Written Opinion dated Apr. 5, 2011, received in International Patent Application No. PCT/US2010/062307, which corresponds to U.S. Appl. No. 12/789,427.

Final Office Action dated Dec. 29, 2010, received in U.S. Appl. No. 11/850,008.

Notice of Allowance dated Mar. 11, 2011, received in U.S. Appl. No. 11/850,008.

Final Office Action dated May 13, 2011, received in U.S. Appl. No. 11/968,067.

Agarawala et al. "Database Compendex/EI," Engineering Information, Inc., Apr. 7, 2006, 1 page.

Agarawala et al., "Keepin'it Real: Pushing the Desktop Metaphor with Physics, Piles and the Pen," CHI Proceedings 2006, Apr. 22-27, 2006, Montréal, Québec, Canada, pp. 1283-1292.

Andrew's Widgets, "Developing Dashboard Widgets-What the Heck is a Widget," printed Jan. 25, 2008, 9 pages, http://andrew.hedges.name/widgets/dev/.

Anonymous, "Asus Eee PC Easy Mode Internet Tab Options," asuseeehacks.blogspot com, Nov. 10, 2007, 33 pages, http://asuseeehacks.blogspot.com/2007/11/asus-eee-pc-user-interface-tour.html.

Anonymous, "Desktop Icon Toy—History," Oct. 8, 2009, 2 pages, http://www.idesksoft.com/history.html.

Apple.com, "Tiger Developer Overview Series-Developing Dashboard Widgets," Jun. 26, 2006, 9 pages, http://developer.apple.com/macosx/dashboard.html.

Apple Computer, Inc., "Dashboard Tutorial," Apple Computer, Inc. ® 2004, 2006, 24 pages.

CNET, "Video:Create custom widgets with Web Clip." CNET News, Aug. 8, 2006, 3 pages, http://news.cnet.com/1606-2-6103525.html.

Fondantfancies, "Dash Ciipping: Don't wait for Mac OS X 10.5 Leopard." fondantfancies.com, Aug. 8, 2006, 9 pages, http://www.fondantfancies.com/blog/3001239/.

Hesseldahl, A., "An App the Mac can Brag About," Forbes.com; Dec. 15, 2003, 2 pages, http://www.forbes.com/2003/12/15/cx_ah_1215tentech_print.html.

Jazzmutant, "Jazzmutant Lemur," Nov. 16, 2005, 3 pages, http://64.233.167.104/search?q=cache:3g4wFSaZiXIJ:www.nuloop.c.

Jazzmutant, "The Lemur: Multitouch Control Surface", printed Nov. 16, 2005, 3 pages http://64233.167.104/search?q=cache:j0_nFbNVzOcj:www.cycling7.

Macworld, "Whip up a widget," Macworld.com., Sep. 23, 2005, 5 pages, http://www.macworld.com/article/46622/2005/09/octgeekfactor.html.

Macworld, "First Look: Leopard first looks: Dashboard," Aug. 9, 2006, 3 pages, http://www.macworld.com/article/52297/2005/08/leodash.html.

Mello, Jr., J. "Tiger's Dashboard Brings Widgets to New Dimension," MacNewsWorld, printed Jun. 23, 2006, 3 pages, http://www.macnewsworld.com/story/42630.html.

Opera Software, "Welcome to Widgetize," Copyright ® , 2006 Opera Software ASA, 1 page, http://widgets.opera.com/widgetize.

Wildarya, "IDesksoft Desktop Icon Toy v2.9," Oct. 16, 2007, 4 pages, http://www.dl4all.com/2007/10/16/idesksoft_desktop_icon_toy_v2.9.html.

(56) References Cited

OTHER PUBLICATIONS

Office Action dated Mar. 14, 2011, received in U.S. Appl. No. 11/969,809, 25 pages (Platzer).
Final Office Action dated Jul. 14, 2011, received in U.S. Appl. No. 11/969,809, 31 pages (Platzer).
Office Action dated Nov. 16, 2011, received in U.S. Appl. No. 11/968,067, 20 pages, (Lemay).
Final Office Action dated Feb. 29, 2012, received in U.S. Appl. No. 11/968,067, 15 pages (Lemay).
Ars Technica, "CoverFlow : my visual album browser needs your help," posted on Ars Technica forum Jun. 27, 2005, 37 pages, http://arstechnica.com/civis/viewtopic.php?f=19&t=313706>.
del Strother, Jonathan, "CoverFlow," http://www.steelskies.com/coverflow, printed Jun. 15, 2006, 14 pages.
Enright, A., "Dissatisfaction Sows Innovation," The Treehouse+ The Cave, , http://web.archive.org/web/20050331055401/http://thetreehouseand . . . , Figures A & B, http://web.archive.org/web/20061221232052/photos3.flickr.com, Dec. 29, 2004, 6 pages.
Enright, A., "Meet CoverFlow," The Treehouse + The Cave, Aug. 13, 2005, 2 pages.
Enright, A., "Visual Browsing on an iBook DS," The Treehouse + The Cave, Dec. 29, 2004, 1 page.
Goehl, D., et al., "Motion Sensors Gaining Inertia with Popular Consumer Electronics," IvensSense, Inc., 5 pages.
Hinckley et al., "Sensing Techniques for Mobile Interaction," UIST 2000 Symposium on User Interface Software and Technology, CHI Letters 2 (2), Nov. 2000, San Diego, CA, 10 pages.
Hinze, C. "Cover Flow—A Beautiful Way to Browse your MP3s," NOISE blog, Feb. 5, 2006, http://noise.typepad.com/noise_blog/2006/02/cover_flow_the_html, 2 pages.
IBM, "Mechanism for Visual Lists and Selections," IBM Technical Disclosure Bulletin, IBM, vol. 40, No. 5, May 1, 1997, 2 page.
Microwaves RF, "MS Motion Sensors Boost Handset Reliability," http://www.mwrf.com/Articles/Print.cfm?ArticleID=12740, Copyright® 2004, Penton Media, Inc., 4 pages.
Rose, M., "Music in the Home: Interfaces for Music Appliances," Personal Technologies (2000), 4:45-53, 8 pages.
Sawyer, B., "Get with the CoverFlow," The Olive Press, Dec. 8, 2005, 2 pages.
International Search Report and Written Opinion dated Jun. 5, 2008, received in International Application No. PCT/US2008/050428, which corresponds to U.S. Appl. No. 11/969,800, 17 pages. (Forstall).
Office Action dated Feb. 16, 2011, received in U.S. Appl. No. 11/969,800, 31 pages (Forstall).
Final Office Action dated Jun. 15, 2011, received in U.S. Appl. No. 11/969,800, 25 pages (Forstall).
Office Action dated Jan. 20, 2012, received in U.S. Appl. No. 11/969,800, 26 pages (Forstall).
Office Action dated May 22, 2012, received in U.S. Appl. No. 11/969,800, 53 pages (Forstall).
Final Office Action dated Nov. 5, 2012, received in U.S. Appl. No. 11/969,800, 61 pages (Forstall).
Notice of Allowance dated Jun. 12, 2013, received in U.S. Appl. No. 11/767,409, 26 pages (Chaudhri).
Office Action dated Dec. 6, 2012, received in Australian Patent Application No. 2011250783, which corresponds to U.S. Appl. No. 11/767,409, 3 pages (Chaudhri).
Notice of Acceptance dated May 16, 2013, received in Australian Patent Application No. 2011250783, which corresponds to U.S. Appl. No. 11/767,409, 2 pages (Chaudhri).
Office Action dated Jan. 3, 2013, received in Canadian Patent Application No. 2,661,200, which corresponds to U.S. Appl. No. 11/767,409, 5 pages (Chaudhri).
Grant Certificate dated Jan. 18, 2013, issued in Hong Kong Patent Application No. 12104856.1, which corresponds to U.S. Appl. No. 11/767,409, 3 pages (Chaudhri).
Grant Certificate dated Jan. 18, 2013, issued in Hong Kong Patent Application No. 12105182.3, which corresponds to U.S. Appl. No. 11/767,409, 3 pages (Chaudhri).

Agarwal, A., "iTunesInlineVideo," Digital Inspiration—The Tech Guide, 27 pages, http://labnol.blogspot.com/2006_09_17_labnol_archive.html, Sep. 23, 2006.
Ahmad, I. et al., "Content-Based Image Retrieval on Mobile Devices," Proc. of SPIE-IS&T Electronic Imaging, vol. 5684, Jan. 2005, 10 pages.
Alam, H. et al., "Web Document Manipulation for Small Screen Devices: A Review," 4 pages, http://www.csc.liv.ac.uk/~wda2003/Papers/Section_II/Paper_8.pdf, Aug. 2003.
Apparao, V. et al., "Level 1 Document Object Model Specification," W3C Working Draft Jul. 20, 1998, 3 pages, http://www.w3.org/TR/WD-DOM/.
Bos, B. et al., "3 Conformance: Requirements and Recommendations,"Cascading Style Sheets, level 2 CSS2 Specification, W3C Recommendation, May 12, 1998, 6 pages, http://www.w3.org/TR/CSS21/conform.html#doctree.
Buyukkokten, O. et al., "Power Browser Efficient Web Browsing for PDAs," Digital Libraries Lab (InfoLab), Stanford University, Stanford, CA, Dec. 27, 2000, 8 pages.
Chen et al., "DRESS: A Slicing Tree Based Web Representation for Various Display Sizes," Microsoft Research, Technical Report MSR-TR-2002-126, Nov. 16, 2002, 9 pages.
Guan et al., "Zoom Selector: A Pen-based Interaction Technique for Small Target Selection," Transactions of the Information Processing Society of Japan, Aug. 2004, vol. 45, No. 8, pp. 2087-2097, Int. Process. Soc. Japan, ISSN 0387-5806.
Hart, K, "Rewriting the Web for Mobile Phones," washingtonpost.com, Jul. 26, 2006, 2 pages, http://www.washingtonpost.com/wp-dyn/content/article/2006/07/25/AR2006072501517_pf.html.
Hinckley et al., "Input/Output Devices and Interaction Techniques," Microsoft Research, Nov. 2004, 79 pages.
Karlson et al., "AppLens and LaunchTile: Two Designs for One-handed Thumb Use on Small Devices," CHI 2005 Apr. 2-7, 2005, Portland, OR, 10 pages.
Karlson et al., "AppLens and LaunchTile: Two Designs for One-handed Thumb Use on Small Devices," PowerPoint presentation, CHI 2005 Apr. 2-7, 2005, Portland, OR, 17 pages.
Kinoma, Kinoma Player 4 EX Documentation [online], Archived Nov. 1, 2006, 28 pages, http://replay.waybackmachine.org/20061101175306/http://www.kinoma.com/index/pd-player-4.
Laakko et al., "Adapting Web Content to Mobile User Agents," IEEE Internet Computing, vol. 9, issue 2, Mar./Apr. 2005, 8 pages.
Palme, J. et al., "MIME Encapsulation of Aggregate Documents, such as HTML," The Internet Society, 1999, 24 pages.
Raman, S. et al., "Application-specific Workload Shaping in Multimedia-enabled Personal Mobile Devices," CODES + ISSS' 06, Oct. 22-25, 2006, Seoul, Korea, Copyright 2006 ACM, 6 pages.
Robie, J., "What is the Document Object Model?" Texcel Research, Aug. 4, 2006, 5 pages, http://www.w3.org/TR-DOM/introduction.html.
Salmre, I., "Chapter 2, Characteristics of Mobile Applications," Salme_02.fm, pp. 19-36, Dec. 20, 2004.
Schreiner, T., "High DPI in IE: Tip & Mystery Solved," Tony Schreiner's Weblog, May 2004, 2 pages, http://blogs.msdn.com/tonyschr/archive/2004/05/05/126305.aspx.
Stampfli, T., "Exploring Full-Screen Mode in Flash Player 9," Jan. 5, 2007, http://web.archive.org/web20070105231635/http://www.adobe.com/devnet/flashplayer/articles/full_screen_mode.html.
Stanek, W. et al., "Chapter 9, Video and Animation Plug-Ins," Web Publishing Professional Reference Edition, copyright 1997 by Sams.net Publishing, http://www.ssuet.edu.pk/taimoor/books/1-57521-198-X/index.htm.
Stanek, W. et al., "Chapter 22, Adding Multimedia to Your Web Site," Web Publishing Professional Reference Edition, copyright 1997 by Sams.net Publishing, http://www.ssuet.edu.pk/taimoor/books/1-57521-198-X/index.htm.
Surfin'Safari, "XUL," 7 pages, Oct. 2003, http://weblogs.mozillazine.org/hyatt/archives/2003_10.html.
w3schools.com, "Multimedia Video Formats," www.w3sschools.com/media/media_videoformats.asp?output=print, Dec. 20, 2006, 2 pages.

(56) References Cited

OTHER PUBLICATIONS w3schools.com, "Playing QuickTime Movies," http://www.w3schools.com/media/media_quicktime.asp?output=print, Dec. 21, 2006, 2 pages.

w3schools.com, "Playing Videos on the Web," www.w3schoois.com/media/media_browservideos.asp?out=print, Dec. 20, 2006, 3 pages.

Wave Technologies, "Certified Internet Webmaster Foundations Study Guide," Wave Technologies International, Inc., a Thomson Learning company, copyright 1988-2000, 88 pages.

Warabino, T. et al., "Video Transcoding Proxy for 3Gwireless Mobile Internet Access," IEEECommunications Magazine, vol. 38, issue 10, Oct. 2000, 6 pages.

weblogs, "Chapter 1: Downloading and Building WebCore," WebCore documentation, 2 pages, http://weblogs.mozillazine.org/hyatt/WebCore/chapter1.html, Aug. 4, 2006.

weblogs, "Chapter 2: An Overview of WebCore," WebCore documention, 3 pages, http://weblogs.mozillazine.org/hyatt/WebCore/chapter2.html, Aug. 4, 2006.

webmasterworld.com, "Page Zooming with IE" webmastetworld.com, Jul. 2004, 7 pages, http://www.webmasterworld.com/forum83/4179.htm.

Wikipedia, "Comparison of Layout Engines," Wikipedia, the free encyclopedia, Jul. 21, 2006, 3 pages, http://en.wikipedia.org/wiki/Comparison_of_layout_engines.

Wikipedia, "KDE," Wikipedia, the free encyclopedia, Jul. 24, 2006, 9 pages, http://en.wikipedia.org/wiki/KDE.

Wikipedia, "KHTML," Wikipedia, the free encyclopedia, July 16, 2006, 3 pages, http://en.wikipedia.org/wiki/KHTML.

Wikipedia, "List of Layout Engines," Jul. 21, 2006, 1 page, http://en.wikipedia.org/wiki/List_of_layout_engines.

Xiao, X. et al., "Slicing—Tree Based Web Page Transformation for Small Displays," CIKM'05, Oct. 31-Nov. 5, 2005, Bremen, Germany, 2 pages.

Yin, X. et al., "Using Link Analysis to Improve Layout on Mobile Devices," WWW2004, May 17-22, 2004, 7 pages, http://www.iw3c2.org/WWW2004/docs/1p338.pdf.

International Search Report and Written Opinion dated Jul. 11, 2008, received in International Application No. PCT/US2007/088893, which corresponds to U.S. Appl. No. 11/961,773 (Williamson).

Office Action dated Aug. 2, 2010, received in U.S. Appl. No. 11/850,008, 17 pages (Anzures).

Final Office Action dated Dec. 29, 2010, received in U.S. Appl. No. 11/850,008, 15 pages (Anzures).

Notice of Allowance dated Mar. 11, 2011, received in U.S. Appl. No. 11/850,008, 8 pages (Anzures).

Office Action dated Sep. 18, 2013, received in U.S. Appl. No. 11/969,800, 83 pages (Forstall).

Office Action dated Apr. 15, 2011, received in U.S. Appl. No. 11/961,773, 34 pages (Williamson).

Final Office Action dated Nov. 2, 2011, received in U.S. Appl. No. 11/961,773, 17 pages (Williamson).

Office Action dated May 10, 2012, received in U.S. Appl. No. 11/961,773, 17 pages (Williamson).

Final Office Action dated Nov. 29, 2012, received in U.S. Appl. No. 11/961,773, 17 pages (Williamson).

Office Action dated Apr. 24, 2013, received in European Patent Application No. 10 799 255.1, which corresponds to U.S. Appl. No. 12/789,427, 9 pages (Anzures).

Office Action dated Sep. 5, 2012, received in U.S. Appl. No. 13/155,304, 23 pages (Anzures).

Notice of Allowance dated Jul. 25, 2013, received in U.S. Appl. No. 13/155,304, 10 pages (Anzures).

Office Action dated. Jul. 9, 2012, received in U.S. Appl. No. 13/464,454, 13 pages (Anzures).

Notice of Allowance dated May 1, 2013, received in U.S. Appl. No. 13/464,454, 17 pages (Anzures).

Office Action dated Nov. 14, 2013, received in Canadian Patent Application No. 2,661,200, which corresponds to U.S. Appl. No. 11/767,409, 2 pages (Chaudhri).

Office Action dated Oct. 9, 2012, received in Japanese Patent Application No. 2009-527624, which corresponds to U.S. Appl. No. 11/767,409, 3 pages (Chaudhri).

Office Action dated Oct. 1, 2013, received in Japanese Patent Application No. 2009 527624, which corresponds to U.S. Appl. No. 11/767,409, 5 pages (Chaudhri).

Office Action dated Nov. 8, 2012, received in Korean Patent Application No. 10 2012 7019029, which corresponds to U.S. Appl. No. 11/767,409, 2 pages (Chaudhri).

Notice of Allowance dated Jun. 26, 2013, received in Korean Patent Application No. 10 2012 7019029, which corresponds to U.S. Appl. No. 11/767,409, 2 pages (Chaudhri).

Office Action dated Aug. 15, 2013, received in U.S. Appl. No. 12/215,651, 30 pages (Chaudhri).

\* cited by examiner

DEVICE, METHOD, AND GRAPHICAL USER INTERFACE WITH CONTENT DISPLAY MODES AND DISPLAY ROTATION HEURISTICS

RELATED APPLICATIONS

This application claims priority to U.S. Provisional Application Ser. No. 61/335,518, filed Jan. 6, 2010, entitled "Device, Method, and Graphical User Interface with Content Display Modes and Display Rotation Heuristics," which is incorporated herein by reference in its entirety.

TECHNICAL FIELD

This relates generally to electronic devices with touch-sensitive surfaces, including but not limited to electronic devices with touch-sensitive surfaces that adjust the display of user interface objects on the touch-sensitive surfaces based on user gestures.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display. Exemplary manipulations include adjusting the position and/or size of one or more user interface objects. Exemplary user interface objects include digital images, video, text, icons, and other graphics.

Existing methods for performing these manipulations are cumbersome, inflexible, and inefficient. For example, existing electronic devices often give little consideration to the physical orientation of a touch-sensitive surface and the relationship between the physical orientation and the characteristics of the user interface objects displayed on the touch-sensitive surface when choosing a method for manipulating multiple user interface objects on the touch-sensitive surface. As a result, an ill-chosen method may create a significant cognitive burden on a user, thereby causing the user to take longer to complete a task with the device, wasting the user's time and a device's power reserve, which can be a particularly important consideration for battery-operated devices.

SUMMARY

Accordingly, there is a need for computing devices with faster, more efficient and flexible methods and interfaces for manipulating user interface objects. Such methods and interfaces may complement or replace conventional methods for manipulating user interface objects. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a multifunction device with a touch-sensitive display. The method includes: playing a first piece of content in a full-size mode on the display at a predefined aspect ratio; while playing the first piece of content on the display in the full-size mode, detecting a first gesture on the display; in response to detecting the first gesture: shrinking the playing of the first piece of content to a first region of the display while keeping the predefined aspect ratio; and displaying information related to the first piece of content in a second region of the display.

In accordance with some embodiments, a multifunction device includes a touch-sensitive display, one or more processors, memory, and one or more programs; the one or more programs are stored in the memory and configured to be executed by the one or more processors and the one or more programs include instructions for performing the operations of the method described above. In accordance with some embodiments, a graphical user interface on a multifunction device with a touch-sensitive display, a memory, and one or more processors to execute one or more programs stored in the memory includes one or more of the elements displayed in the method described above, which are updated in response to inputs, as described in the method above. In accordance with some embodiments, a computer readable storage medium has stored therein instructions which when executed by a multifunction device with a touch-sensitive display, cause the device to perform the operations of the method described above. In accordance with some embodiments, a multifunction device includes: a touch-sensitive display and means for performing the operations of the method described above. In accordance with some embodiments, an information processing apparatus, for use in a multifunction device with a touch-sensitive display, includes means for performing the operations of the method described above.

Thus, multifunction devices with touch-sensitive displays are provided with faster, more efficient methods and interfaces for manipulating user interface objects, thereby increasing the effectiveness, efficiency, and user satisfaction with such devices. Such methods and interfaces may complement or replace conventional methods for manipulating user interface objects.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
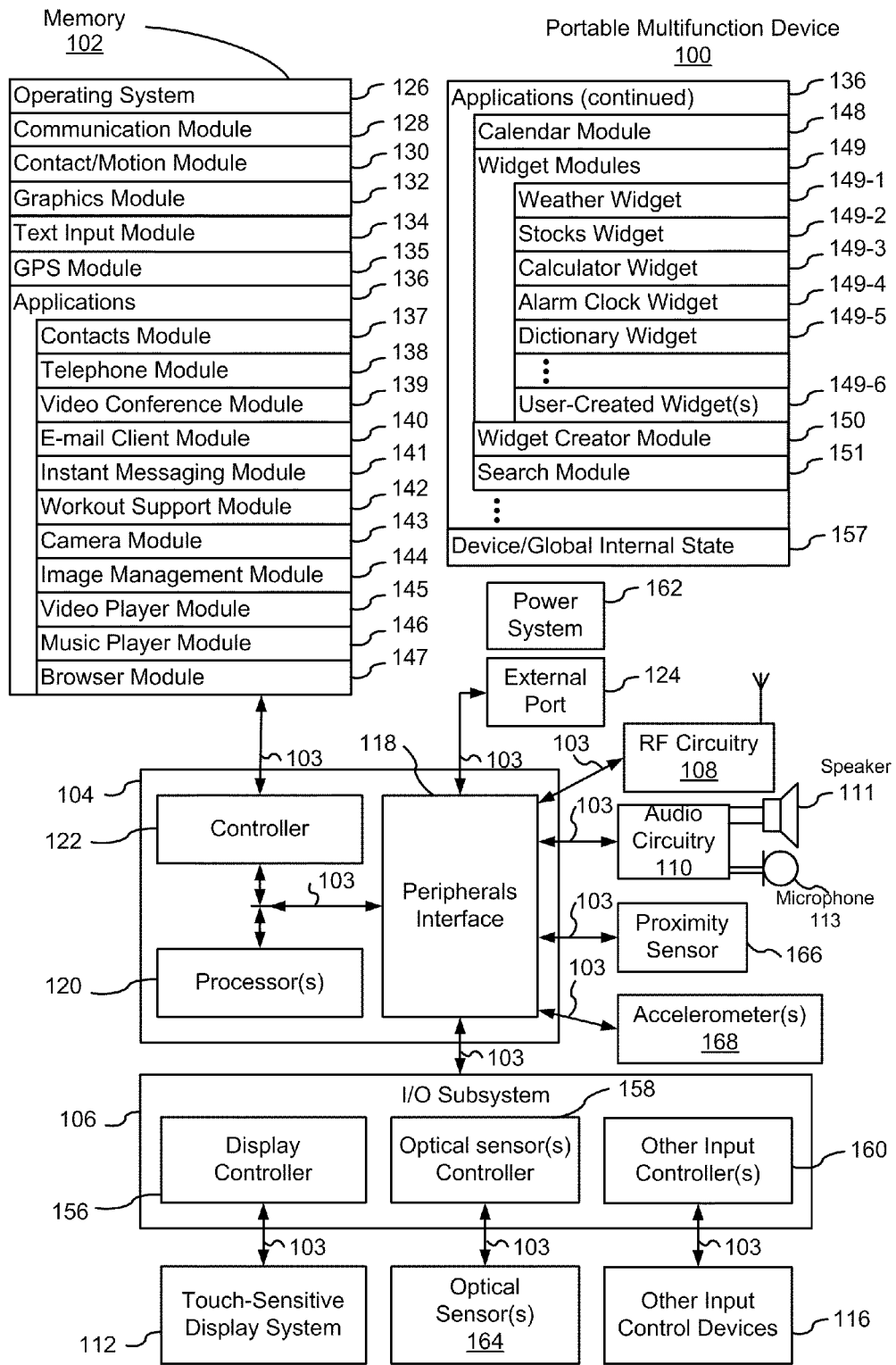
FIG. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® and iPod Touch® devices from Apple Inc. of Cupertino, California. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
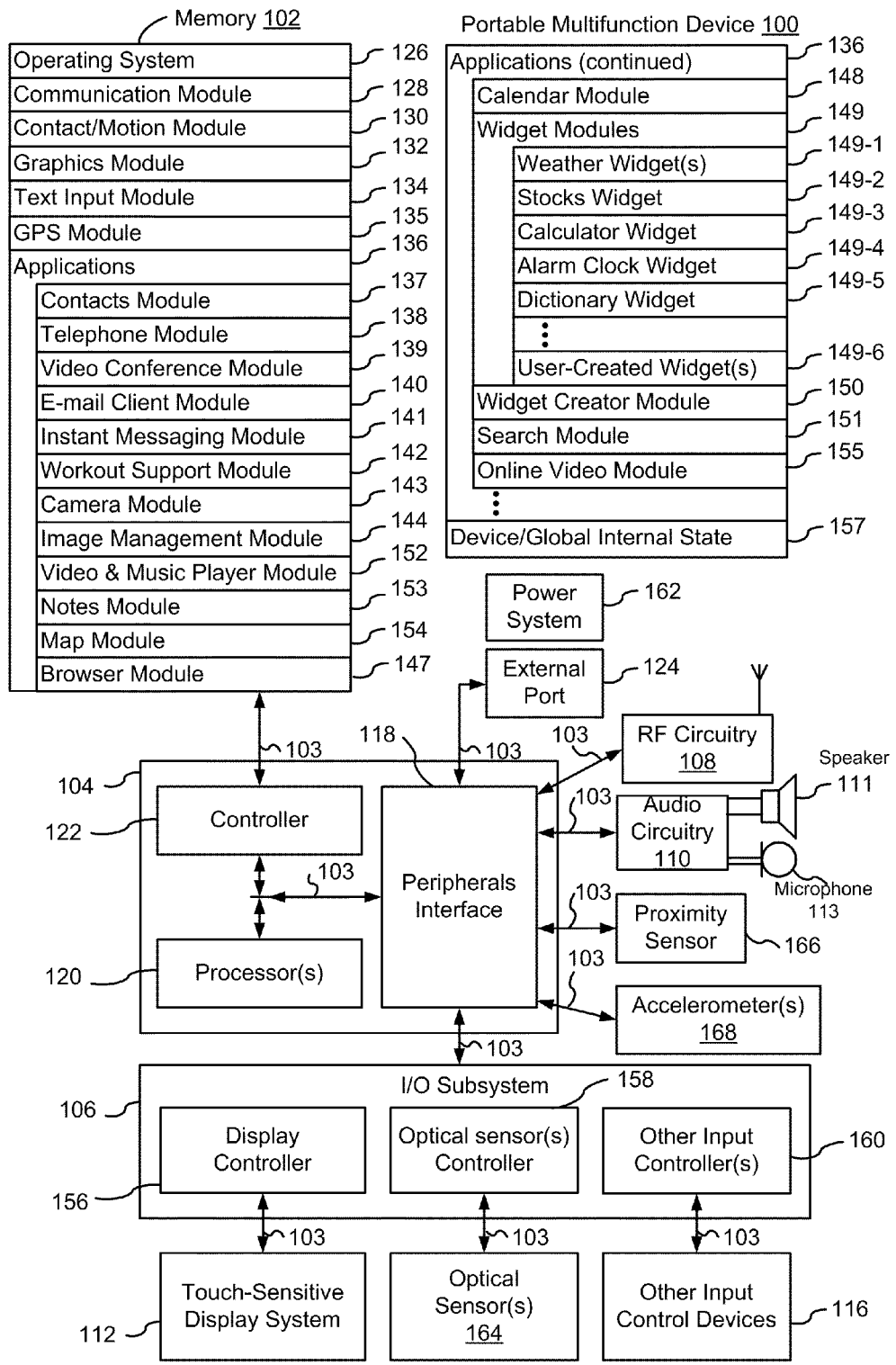

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
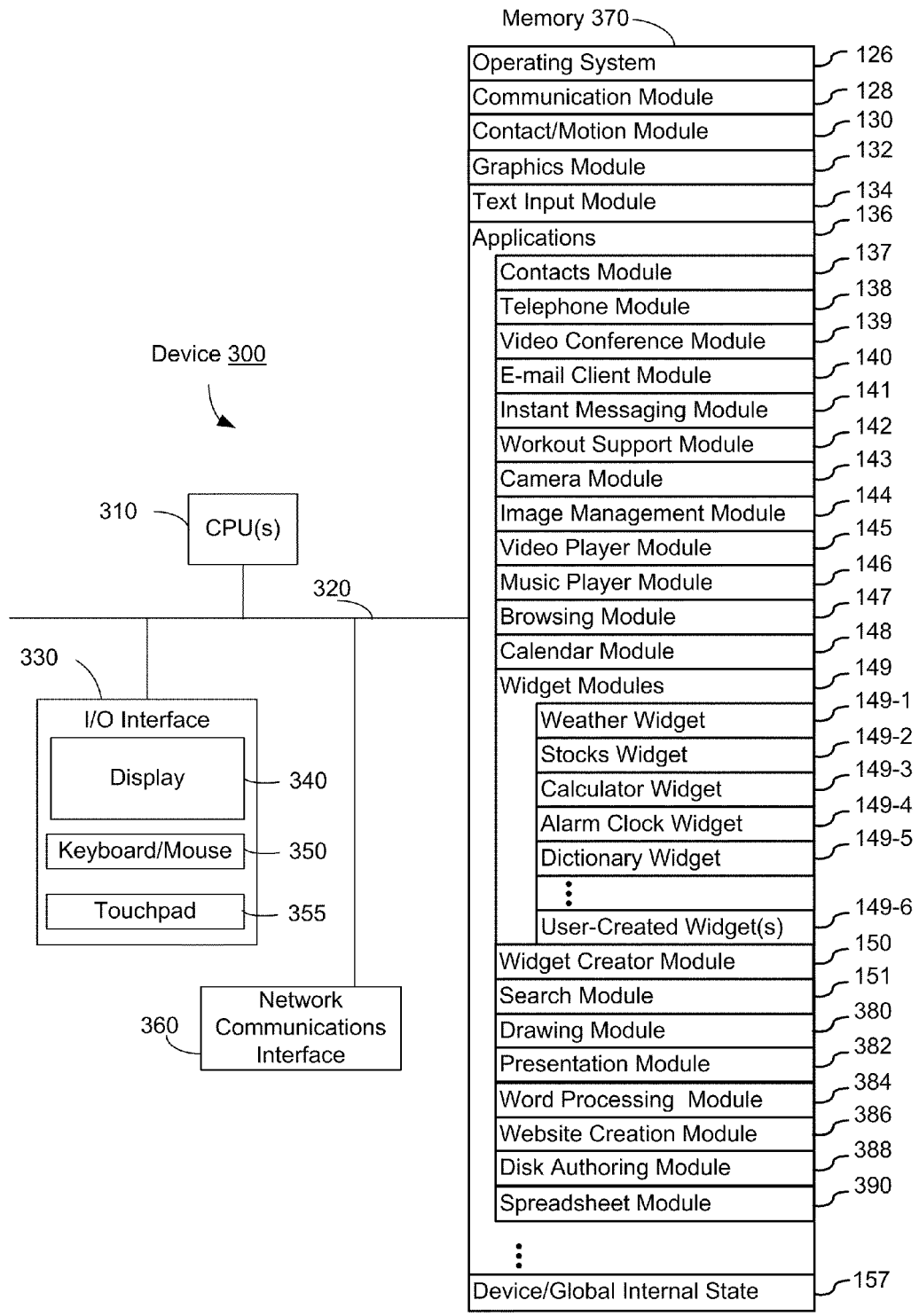
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
video player module 145;
music player module 146;
browser module 147;
calendar module 148;
widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which merges video player module 145 and music player module 146;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
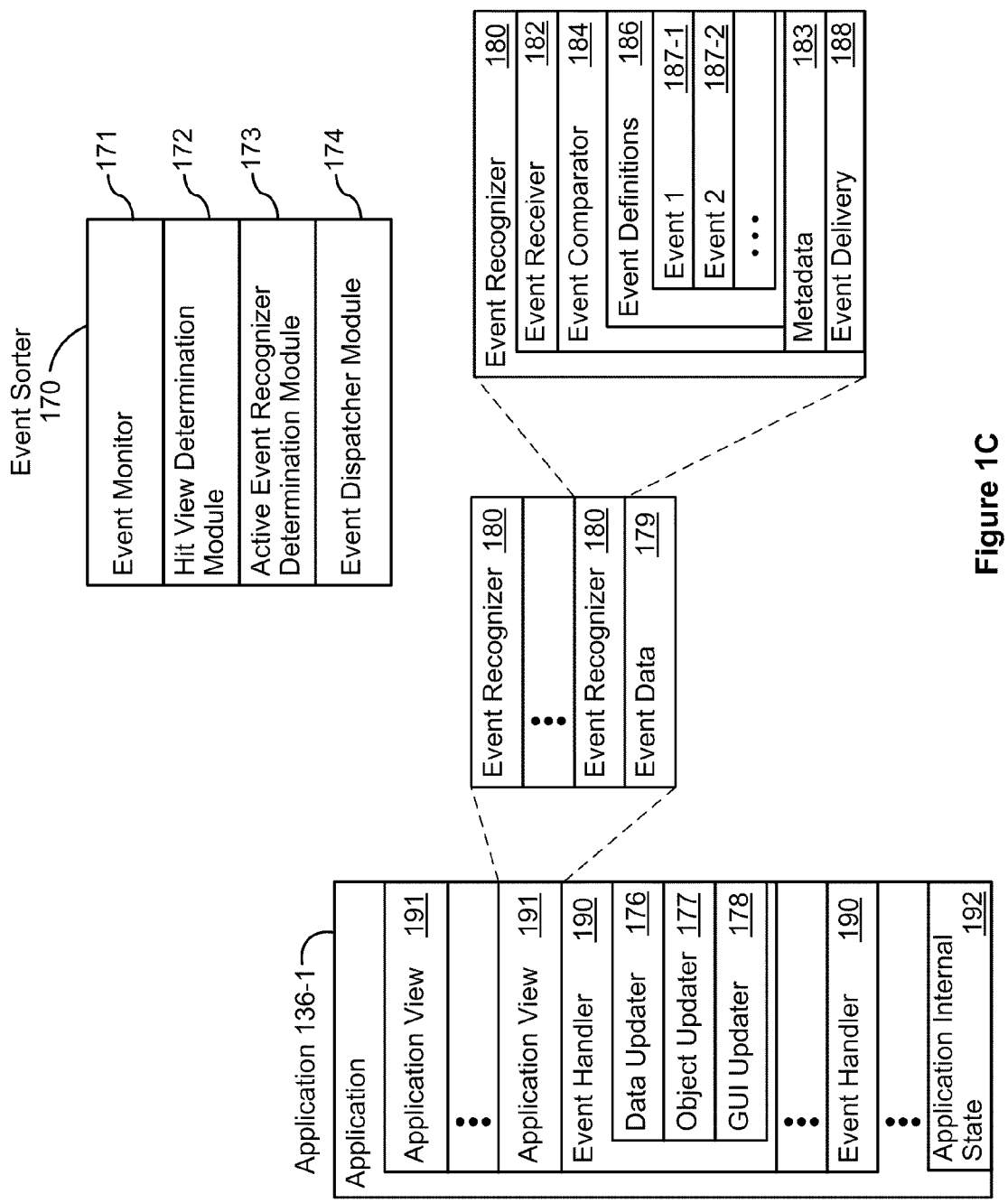
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
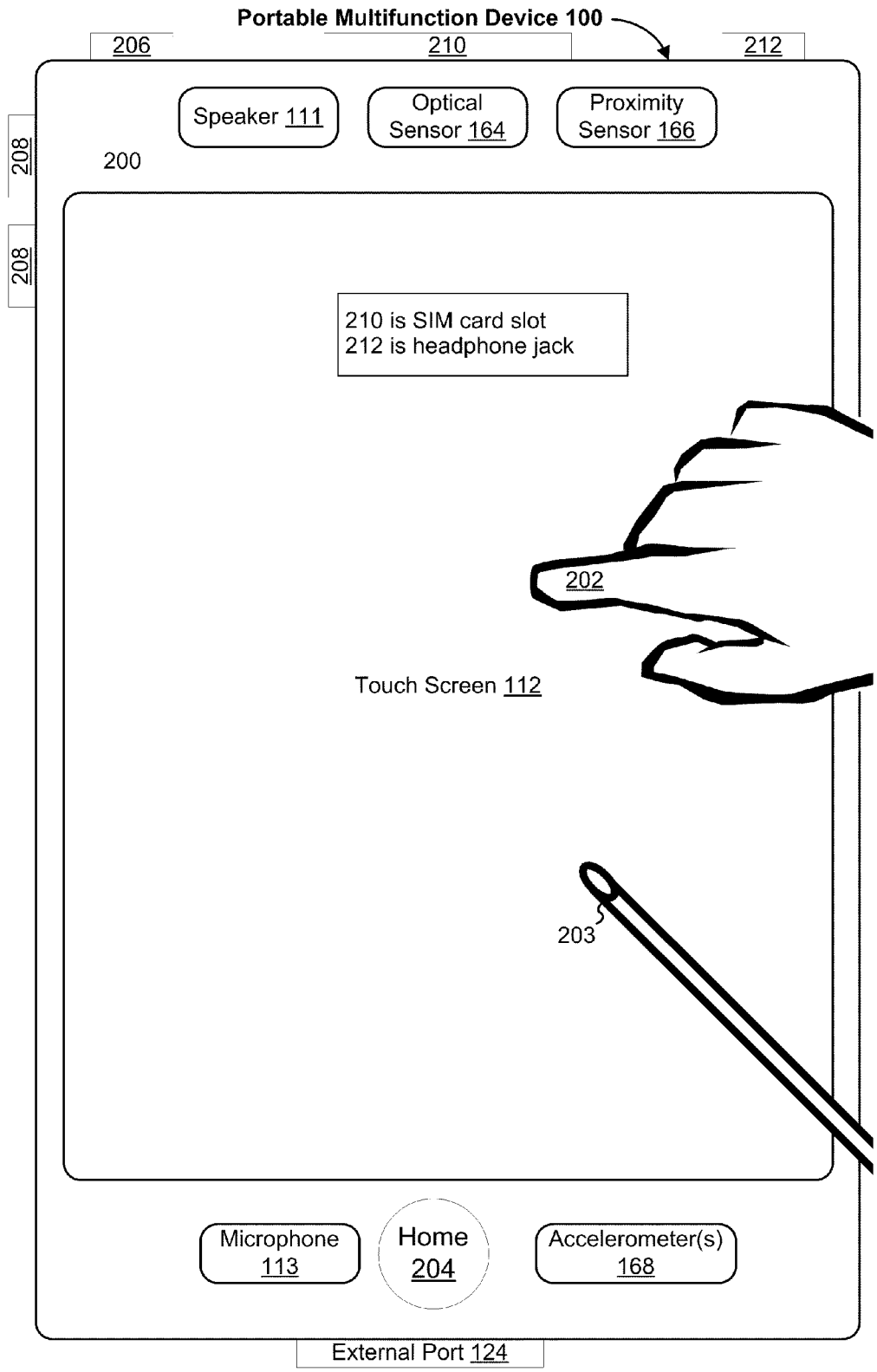
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
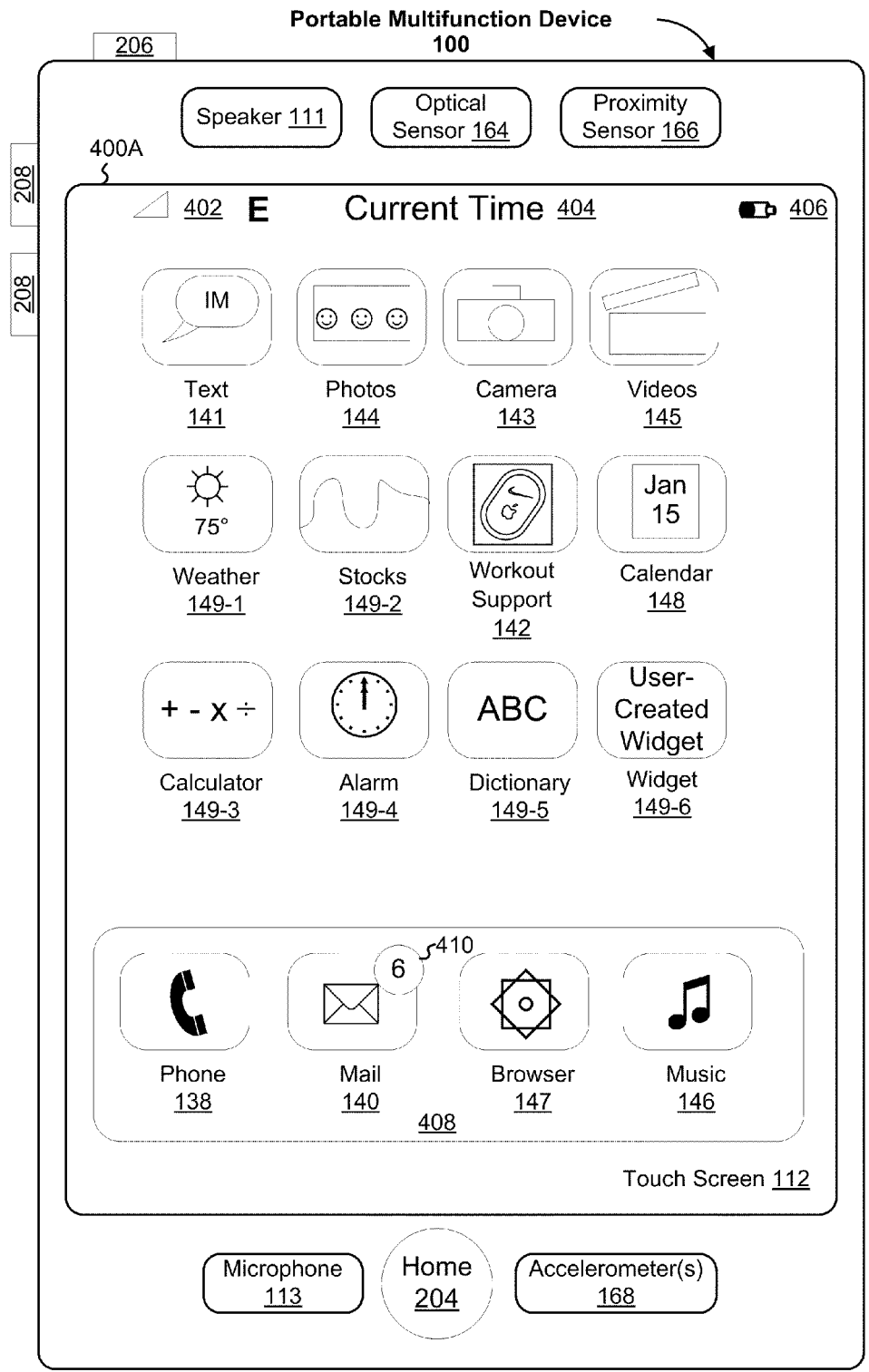
FIGS. 4A and 4B illustrate exemplary user interfaces for a menu of applications on a portable multifunction device in accordance with some embodiments.
Figure 4B:
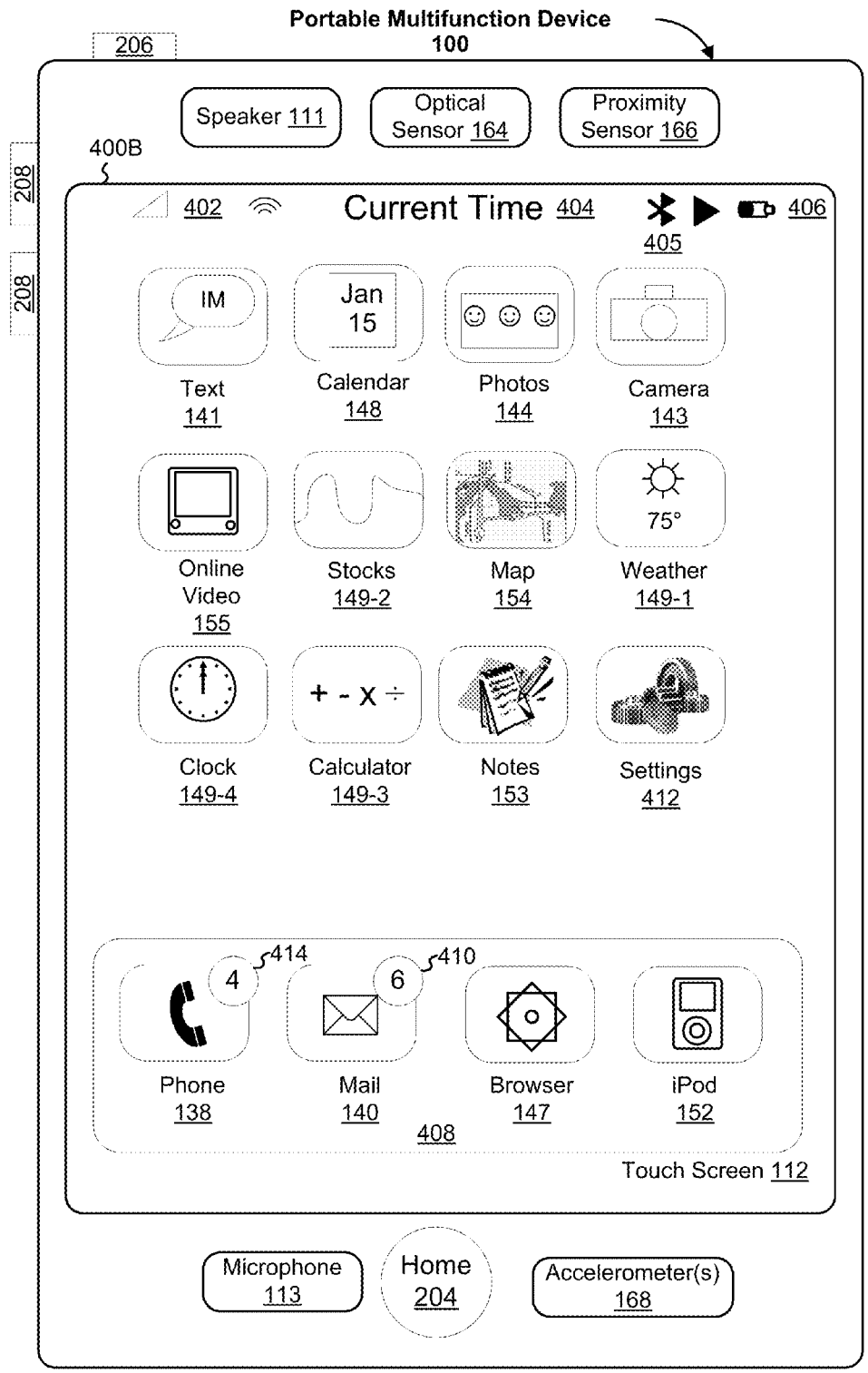

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Phone 138, which may include an indicator 414 of the number of missed calls or voicemail messages;
  - E-mail client 140, which may include an indicator 410 of the number of unread e-mails;
  - Browser 147; and
  - Music player 146; and
- Icons for other applications, such as:
  - IM 141;
  - Image management 144;
  - Camera 143;
  - Video player 145;
  - Weather 149-1;
  - Stocks 149-2;
  - Workout support 142;
  - Calendar 148;
  - Calculator 149-3;
  - Alarm clock 149-4;
  - Dictionary 149-5; and
  - User-created widget 149-6.

In some embodiments, user interface 400B includes the following elements, or a subset or superset thereof:

- 402, 404, 405, 406, 141, 148, 144, 143, 149-3, 149-2, 149-1, 149-4, 410, 414, 138, 140, and 147, as described above;
- Map 154;
- Notes 153;
- Settings 412, which provides access to settings for device 100 and its various applications 136, as described further below;
- Video and music player module 152, also referred to as iPod (trademark of Apple Inc.) module 152; and
- Online video module 155, also referred to as YouTube (trademark of Google Inc.) module 155.

Figure 4C:
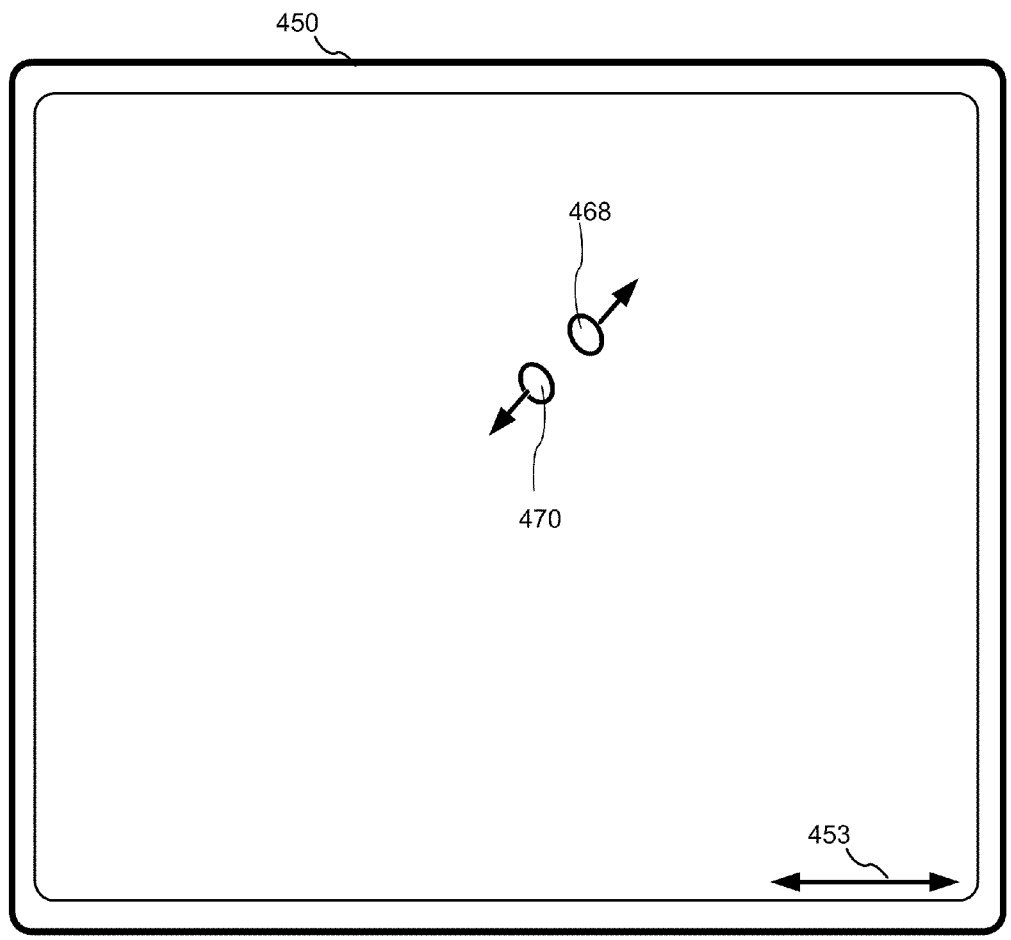
FIG. 4C illustrates an exemplary user interface for a multifunction device with a touch-sensitive surface that is separate from the display in accordance with some embodiments.
Figure 4C:
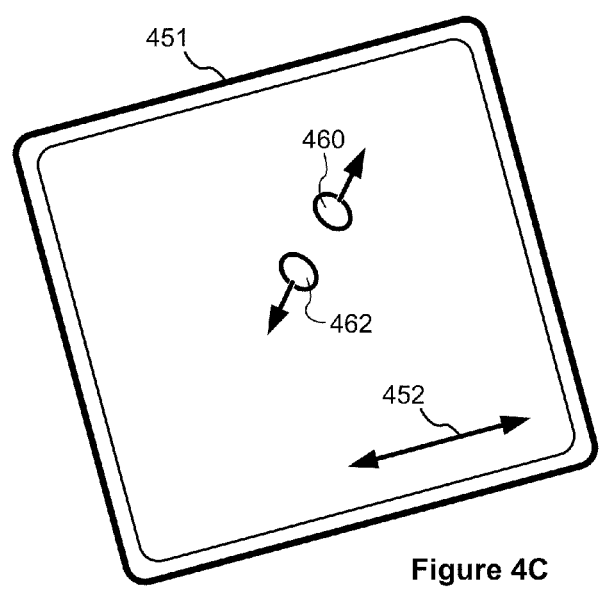

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on a touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Attention is now directed towards embodiments of user interfaces ("UI") and associated processes that may be implemented on a multifunction device with a display and a touch-sensitive surface, such as device 300 or portable multifunction device 100.

Figure 5A:
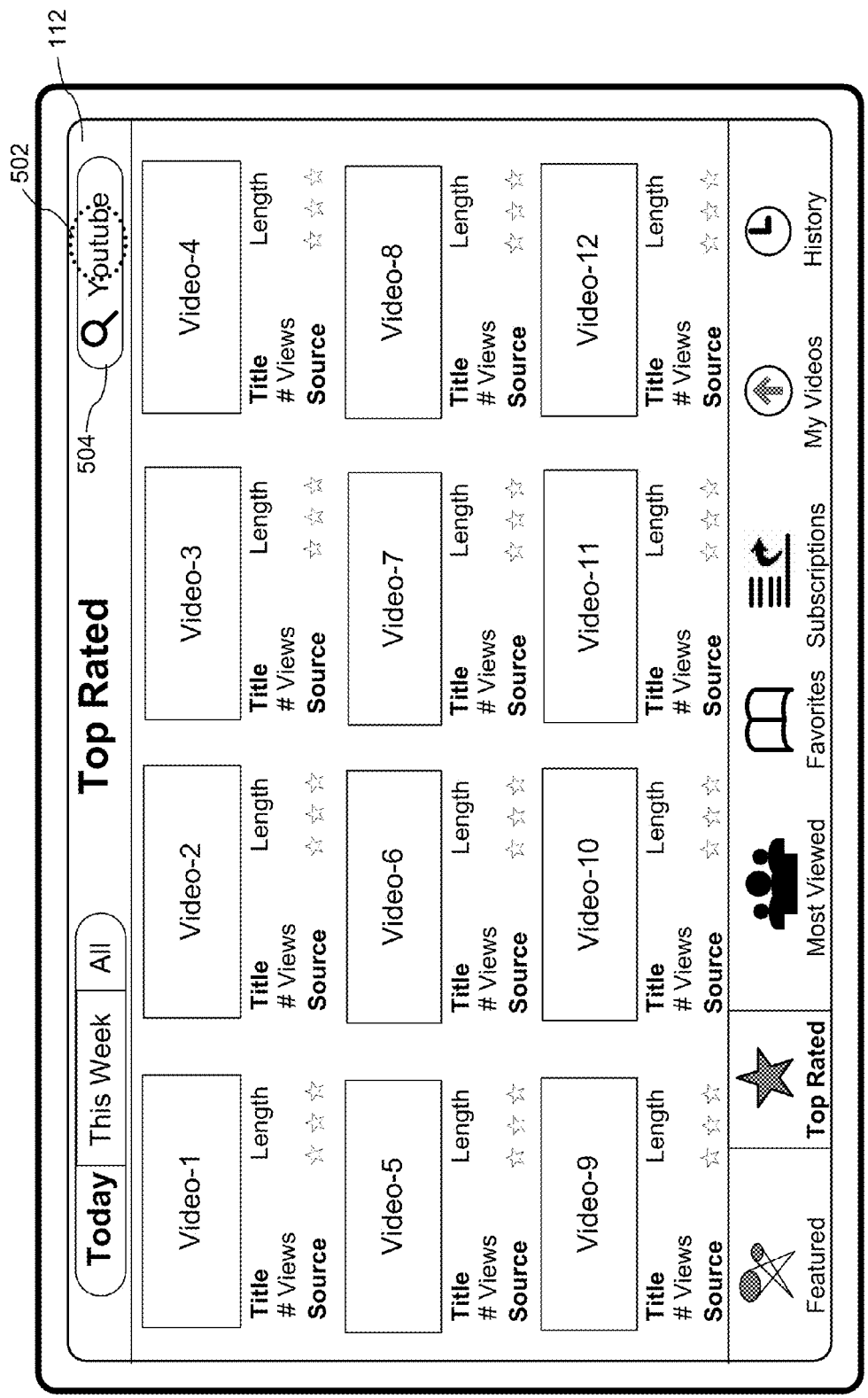
FIGS. 5A-5O illustrate exemplary user interfaces for manipulating user interface objects on a touch screen display in accordance with some embodiments.
Figure 5B:
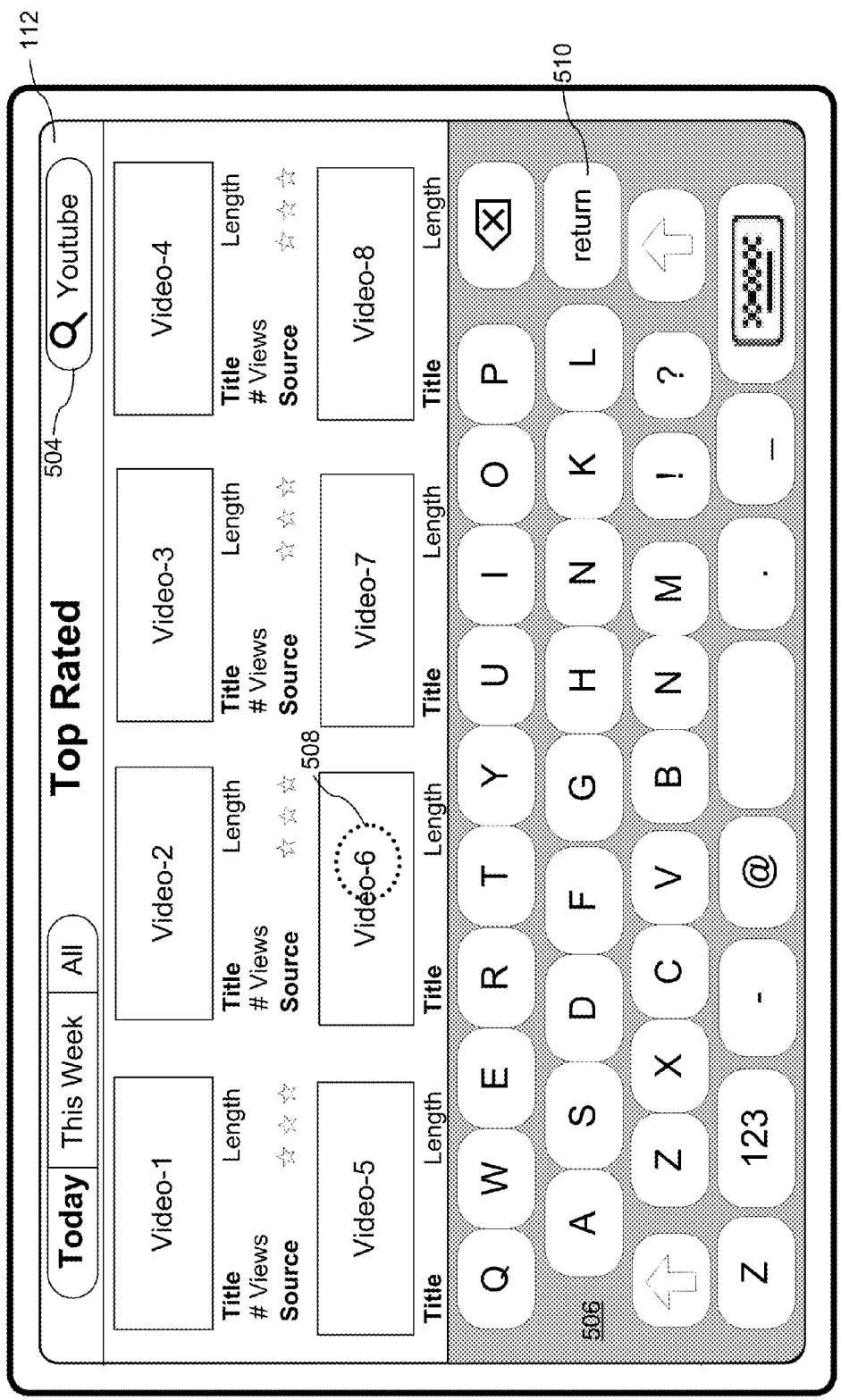
Figure 5C:
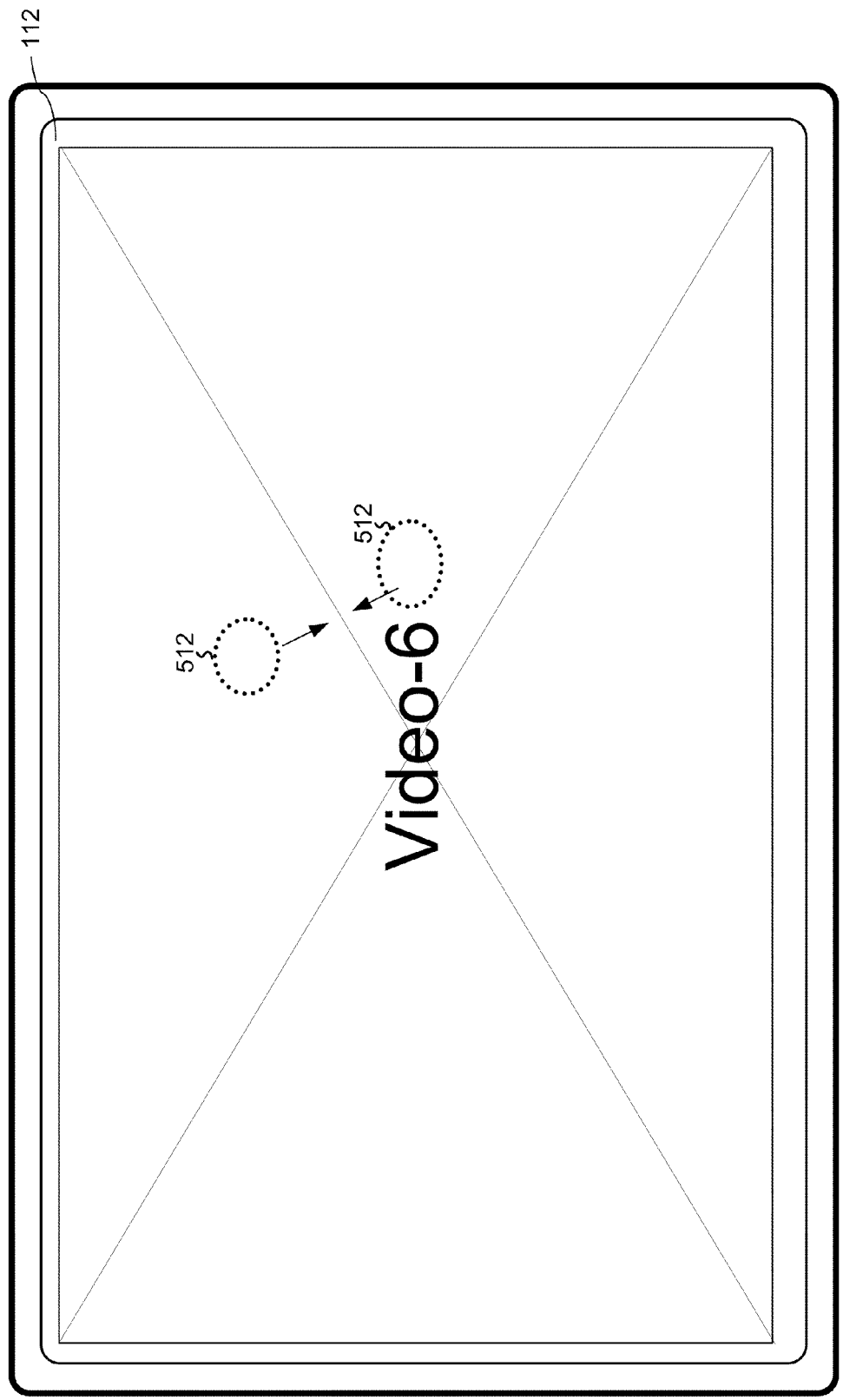
Figure 5D:
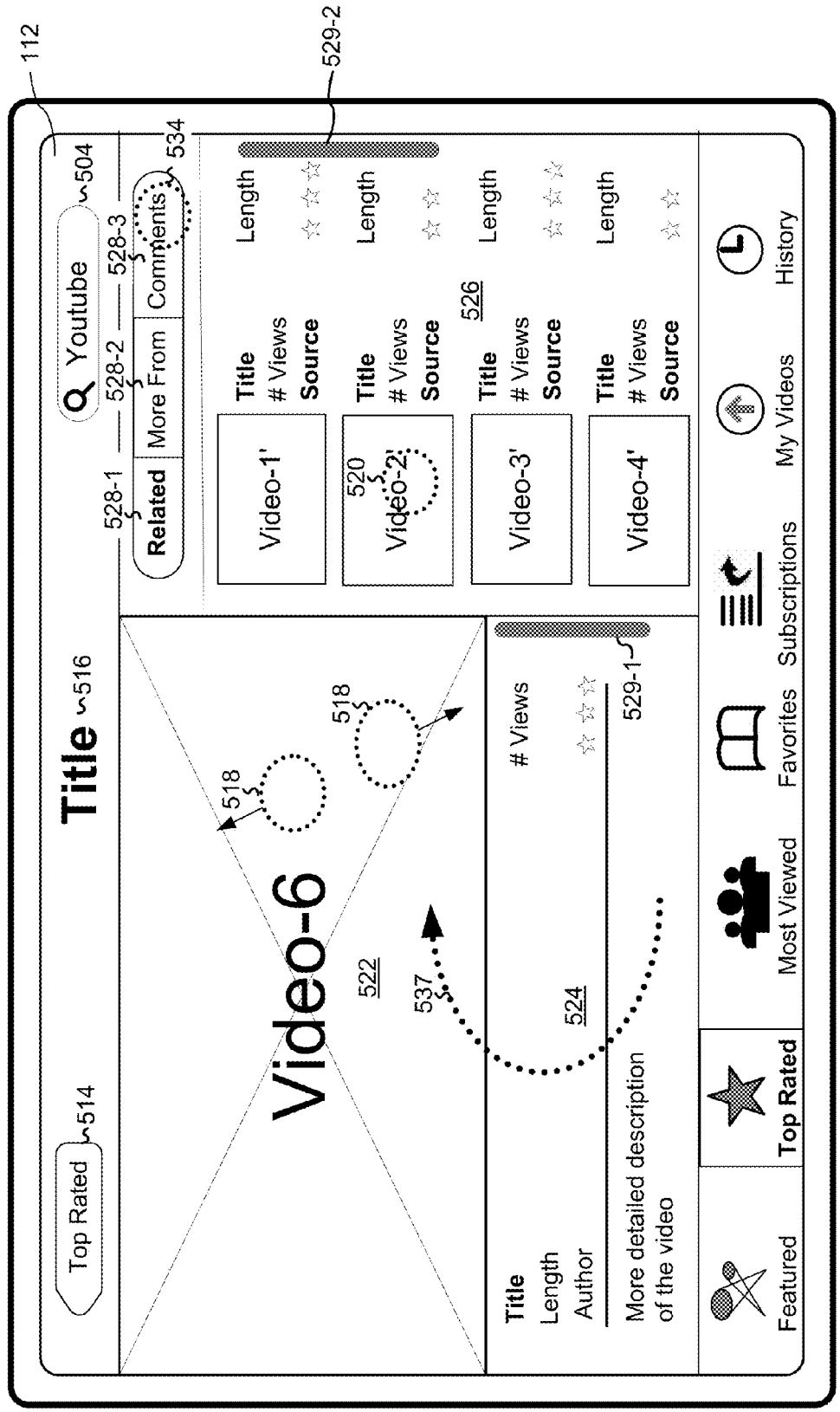
Figure 5E:
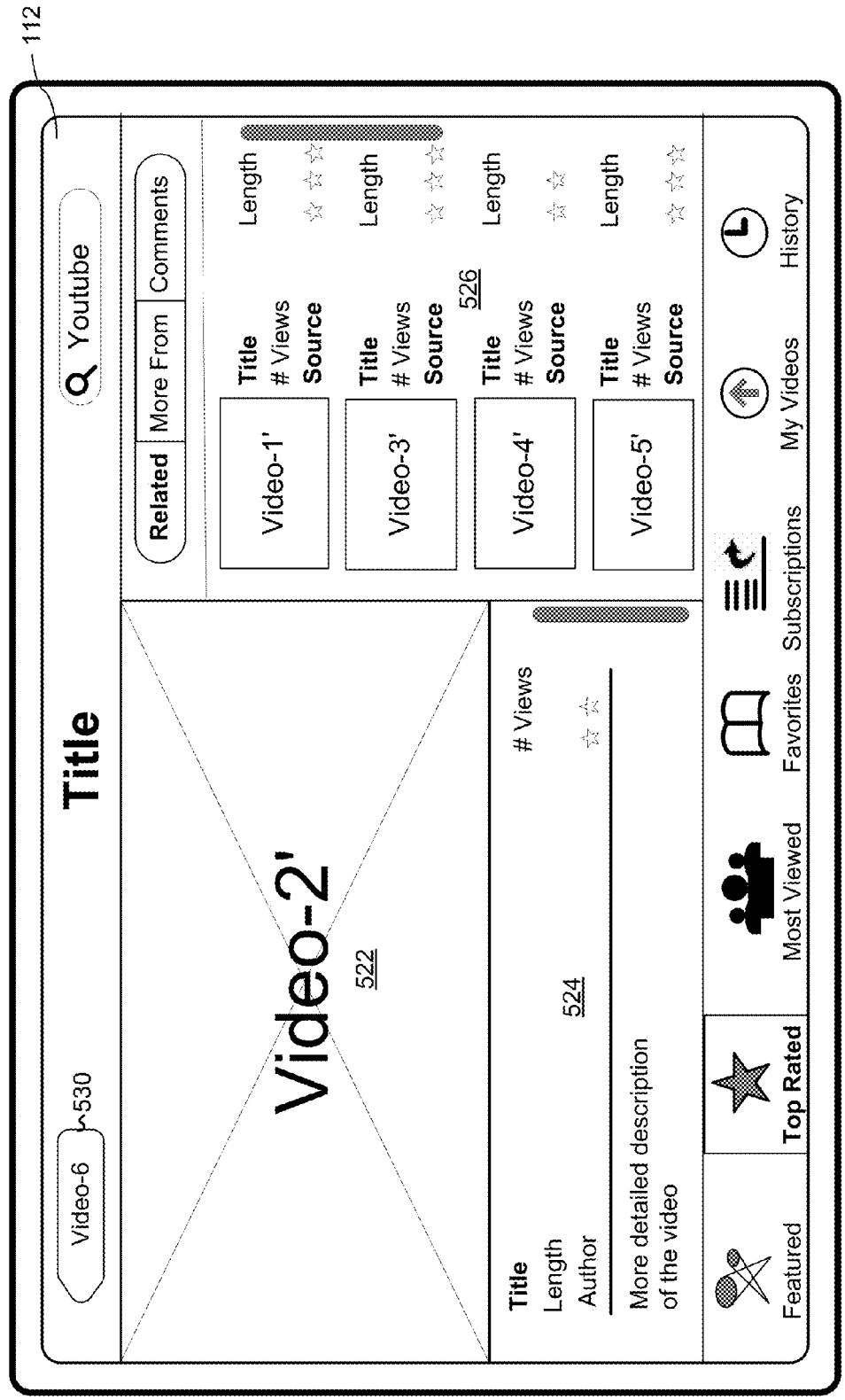
Figure 5F:
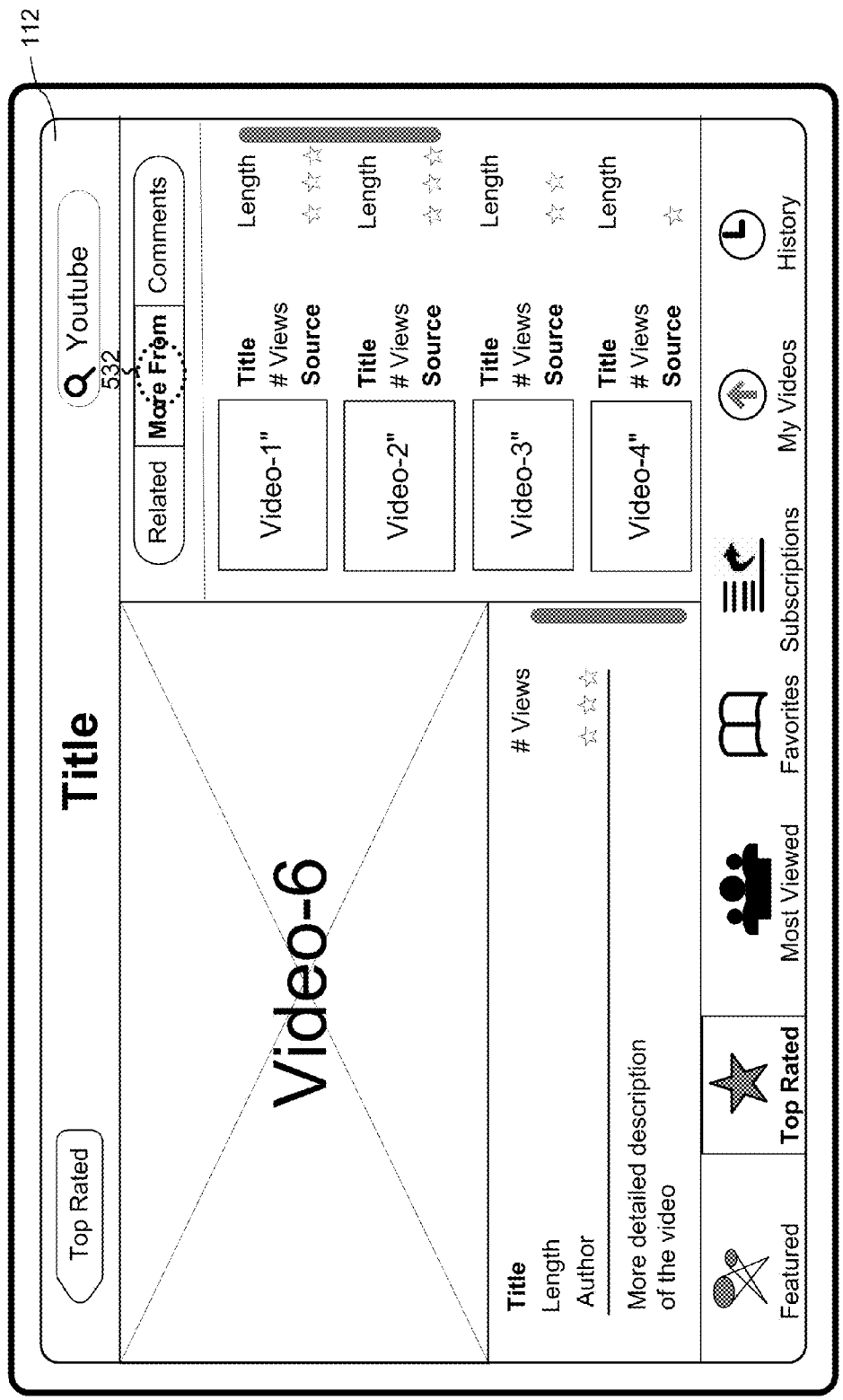
Figure 5G:
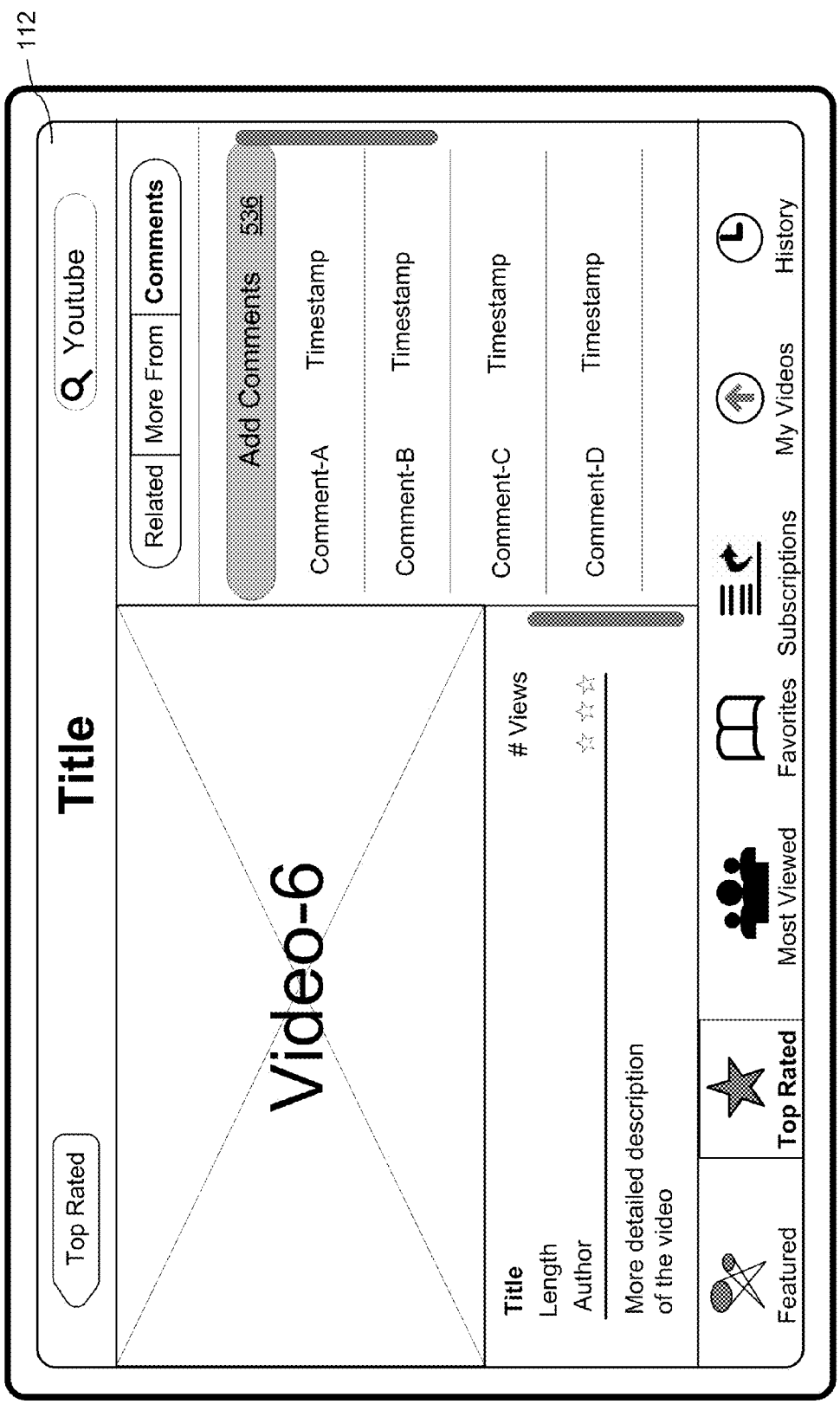
Figure 5H:
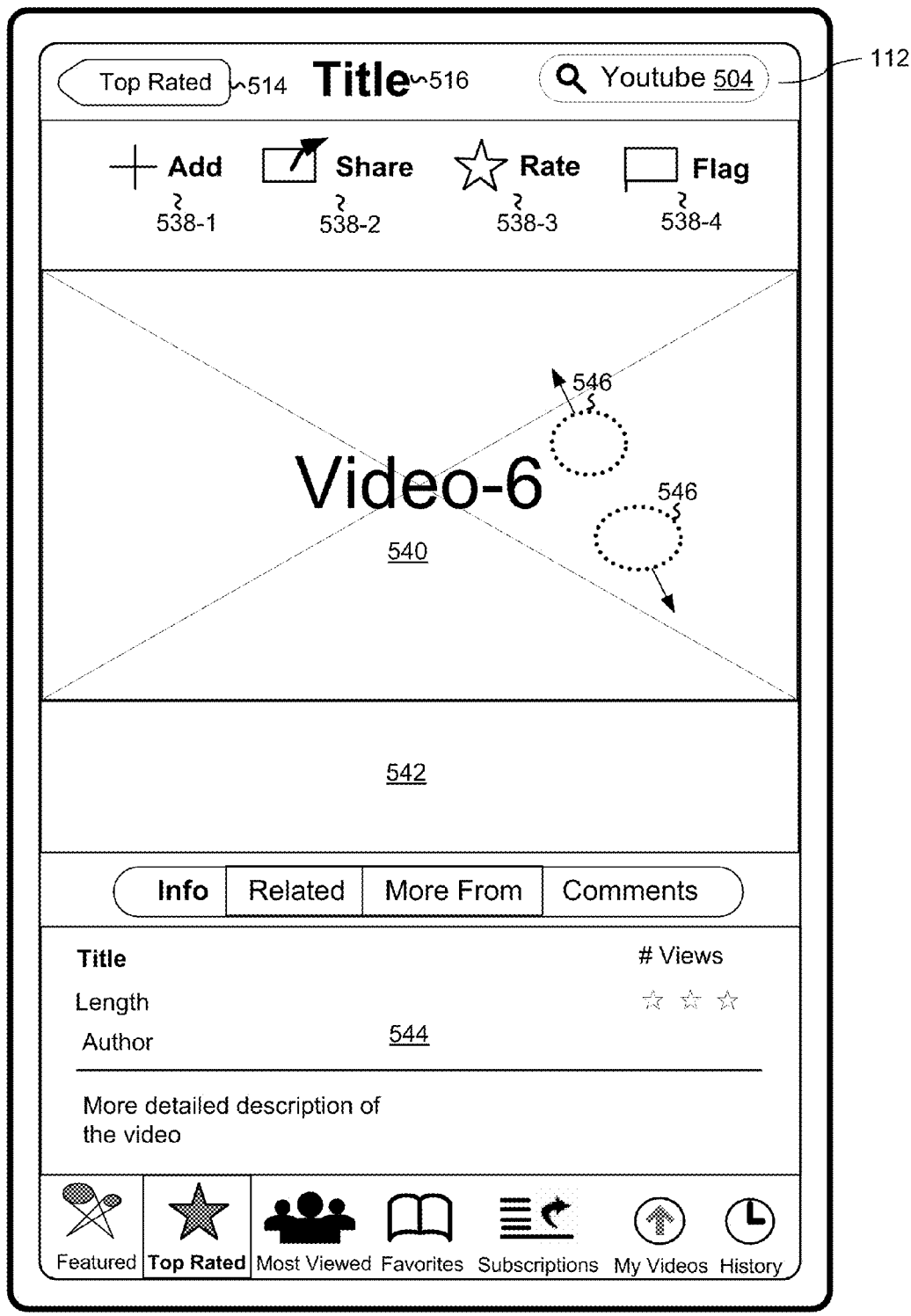
Figure 5I:
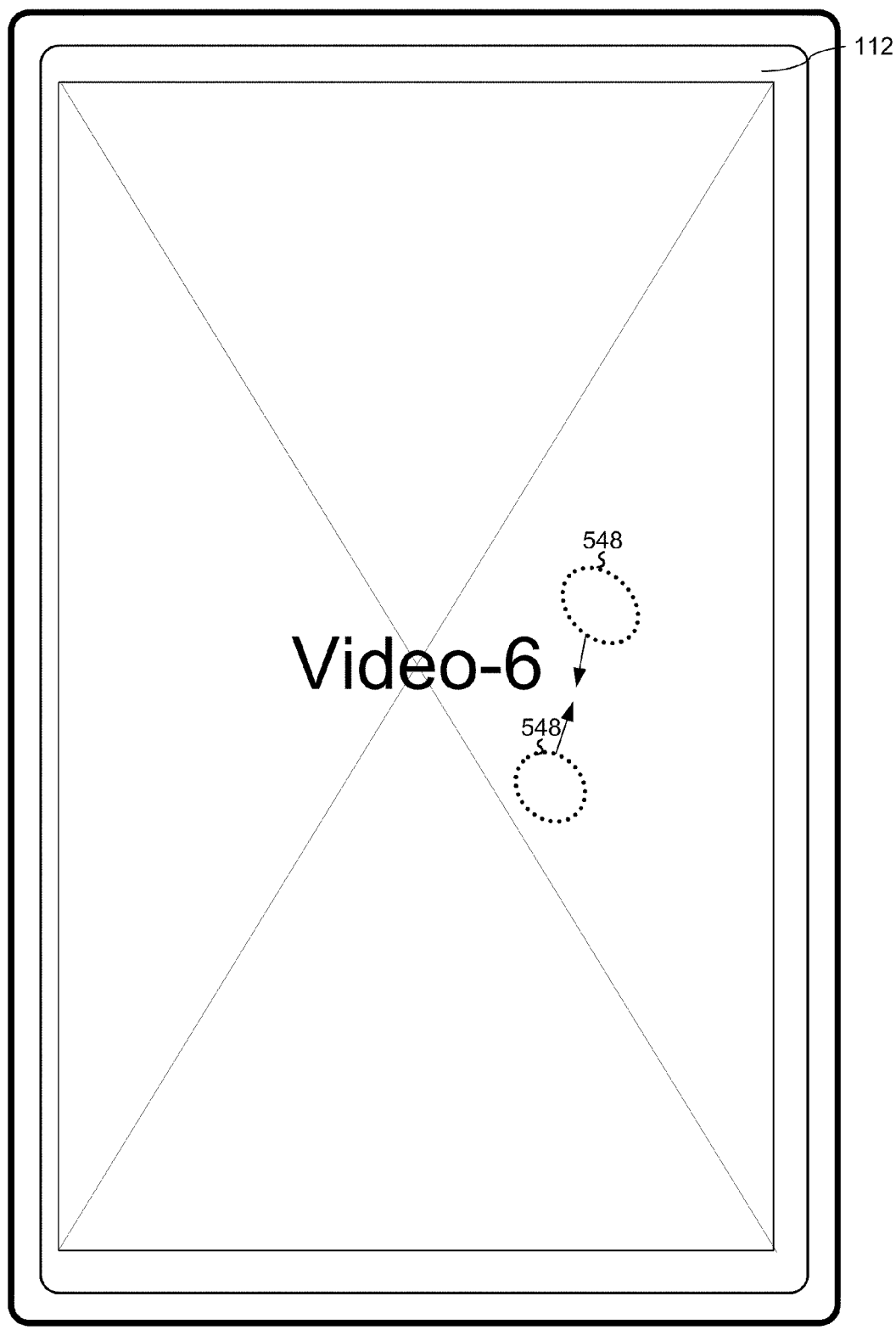
Figure 5J:
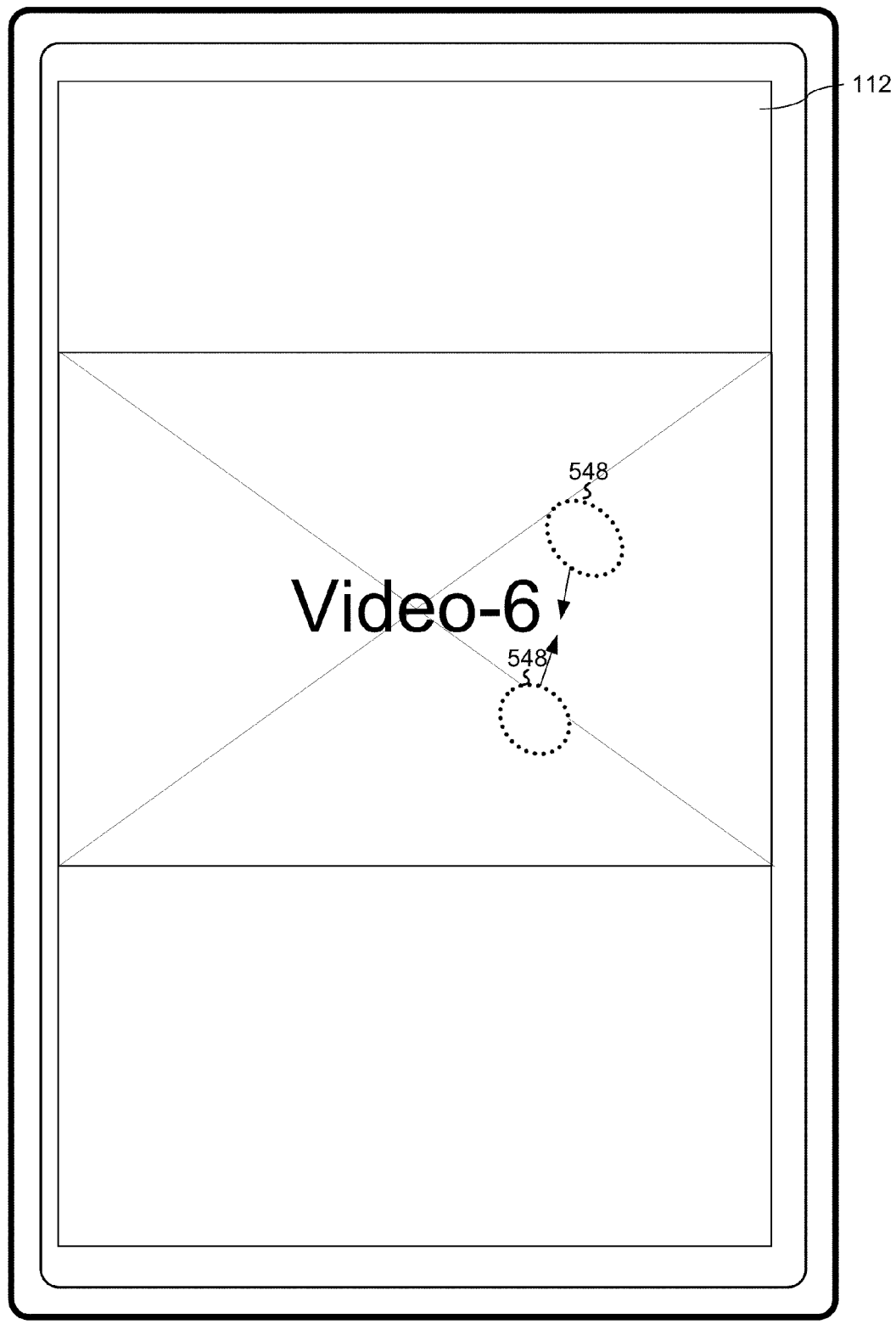
Figure 5K:
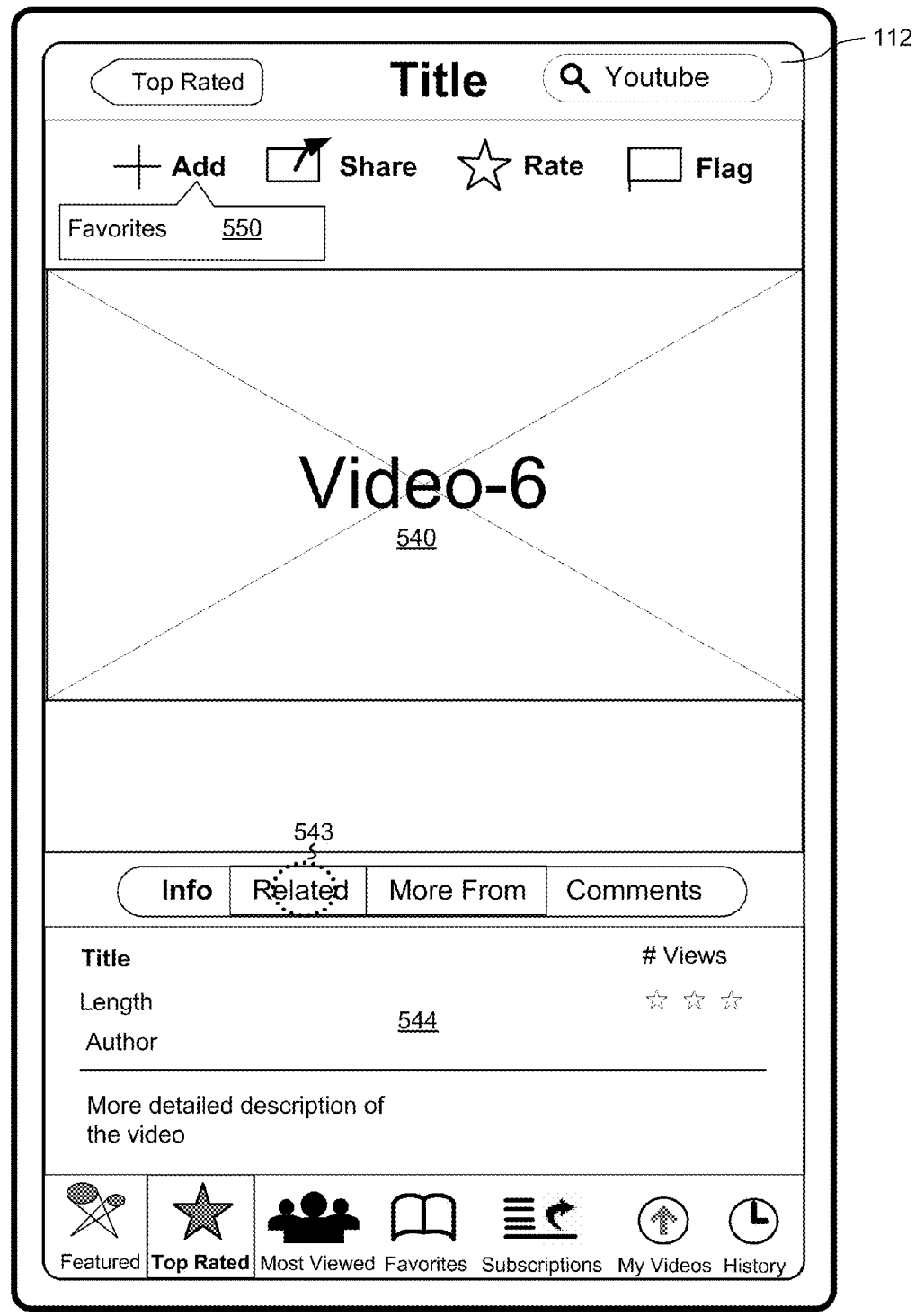
Figure 5L:
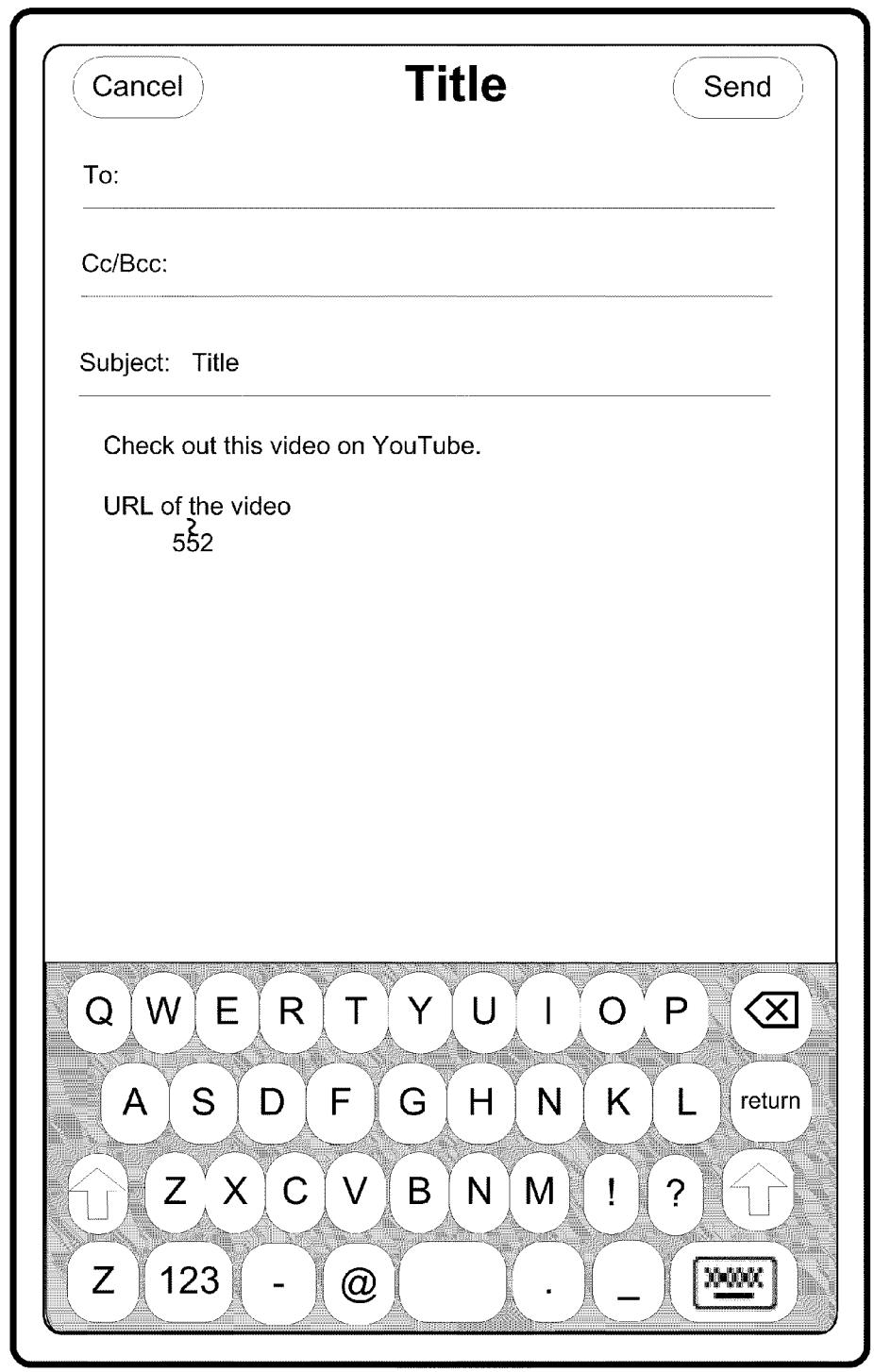
Figure 5M:
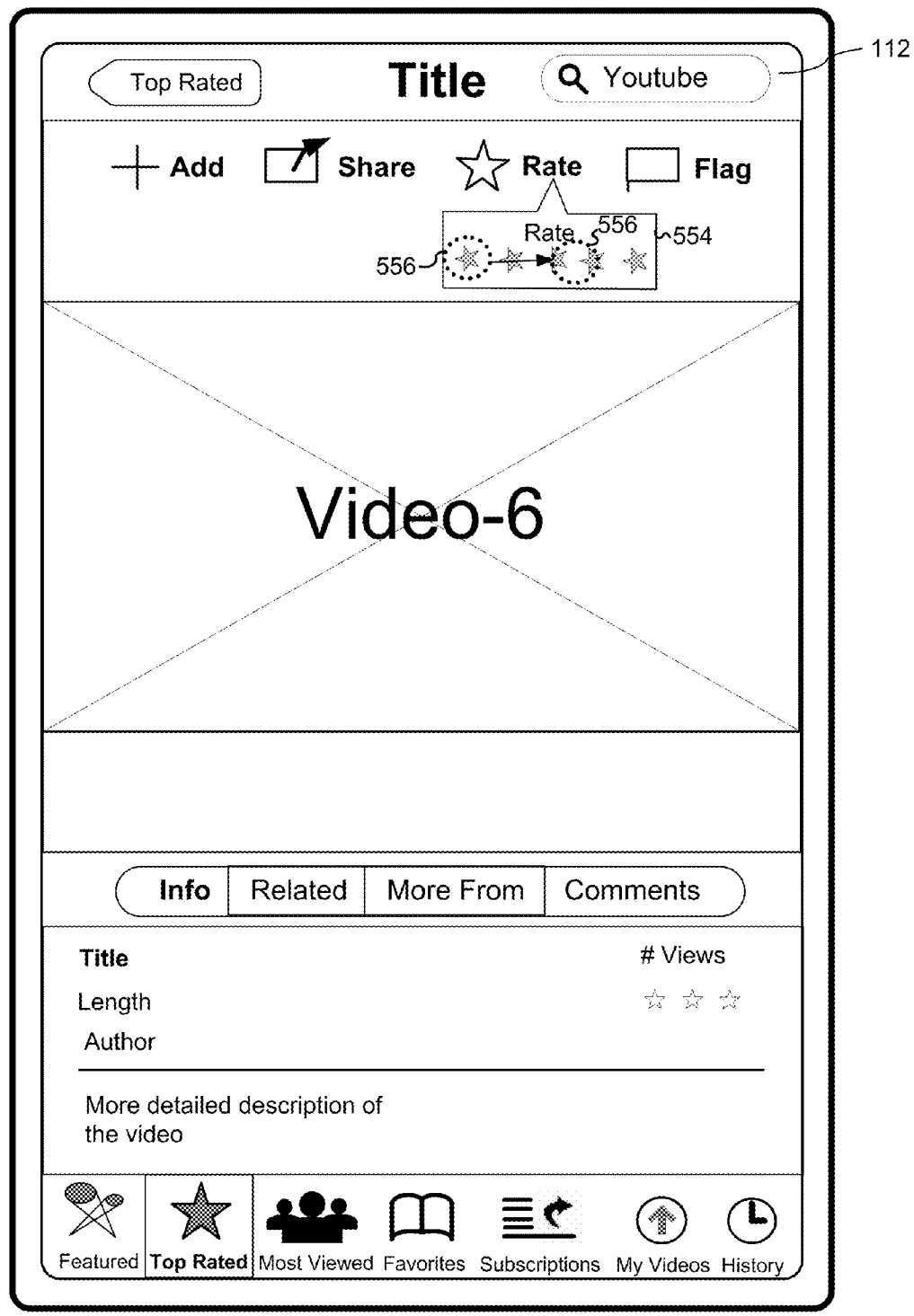
Figure 5N:
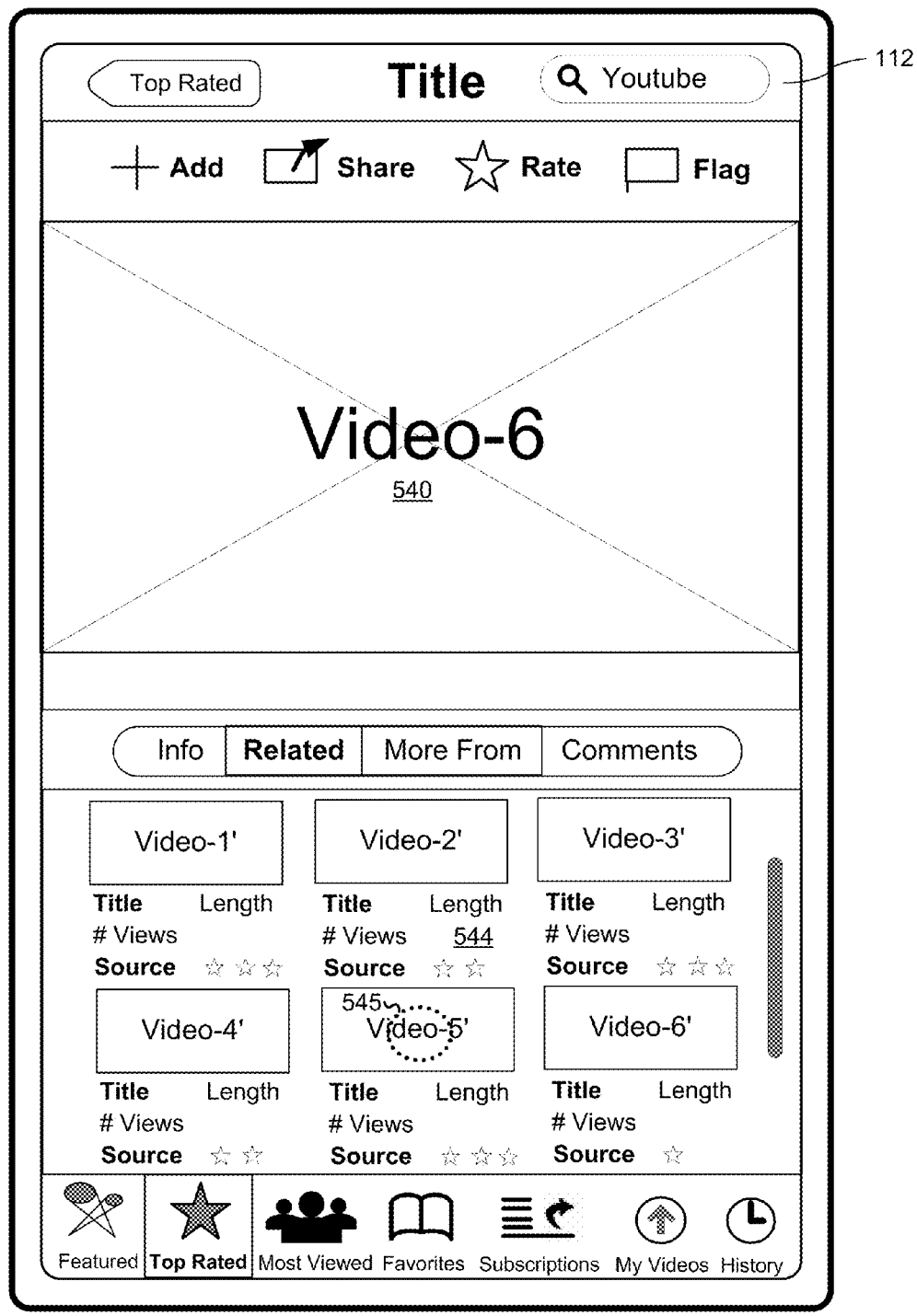
Figure 5O:
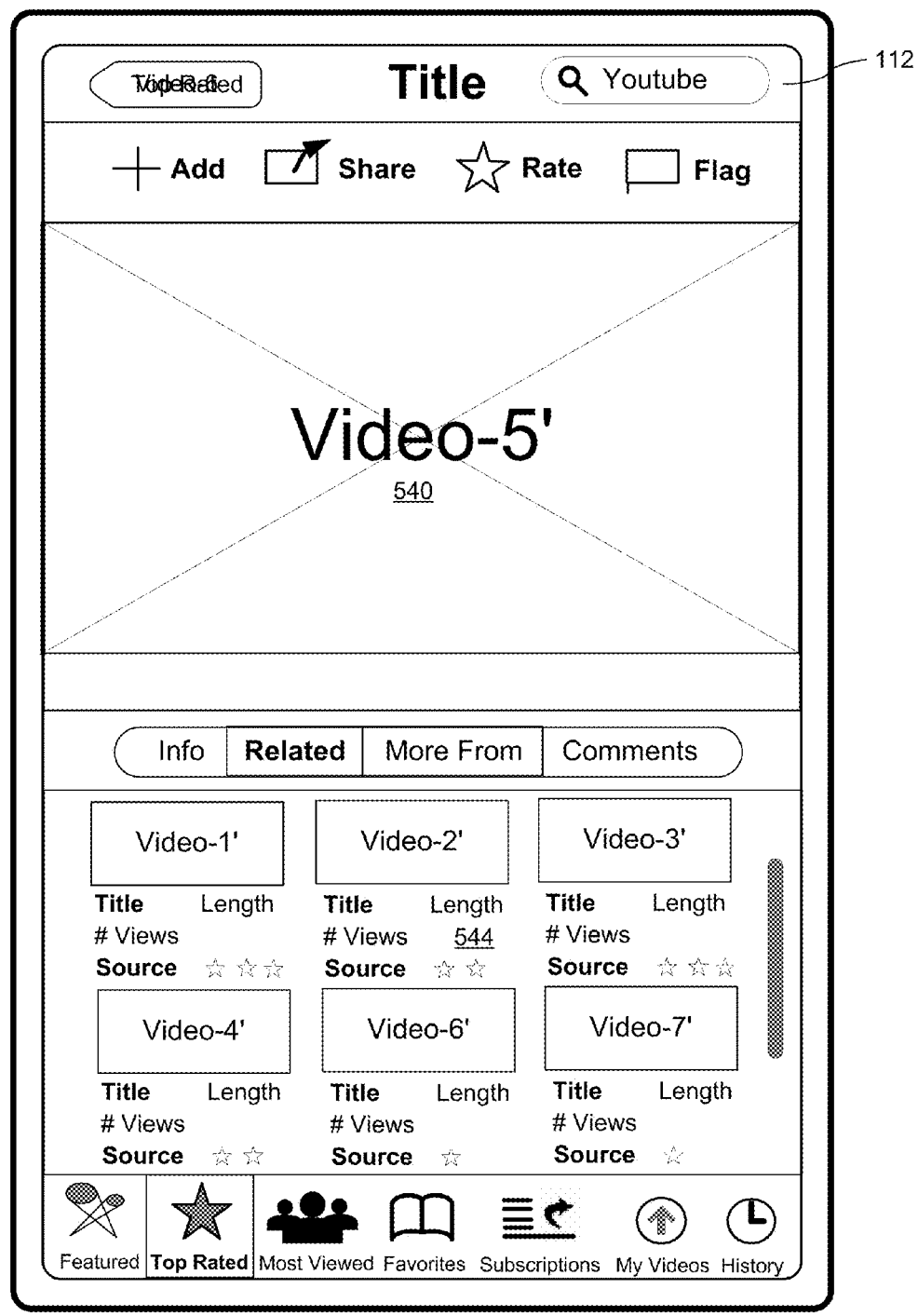
Figure 6A:
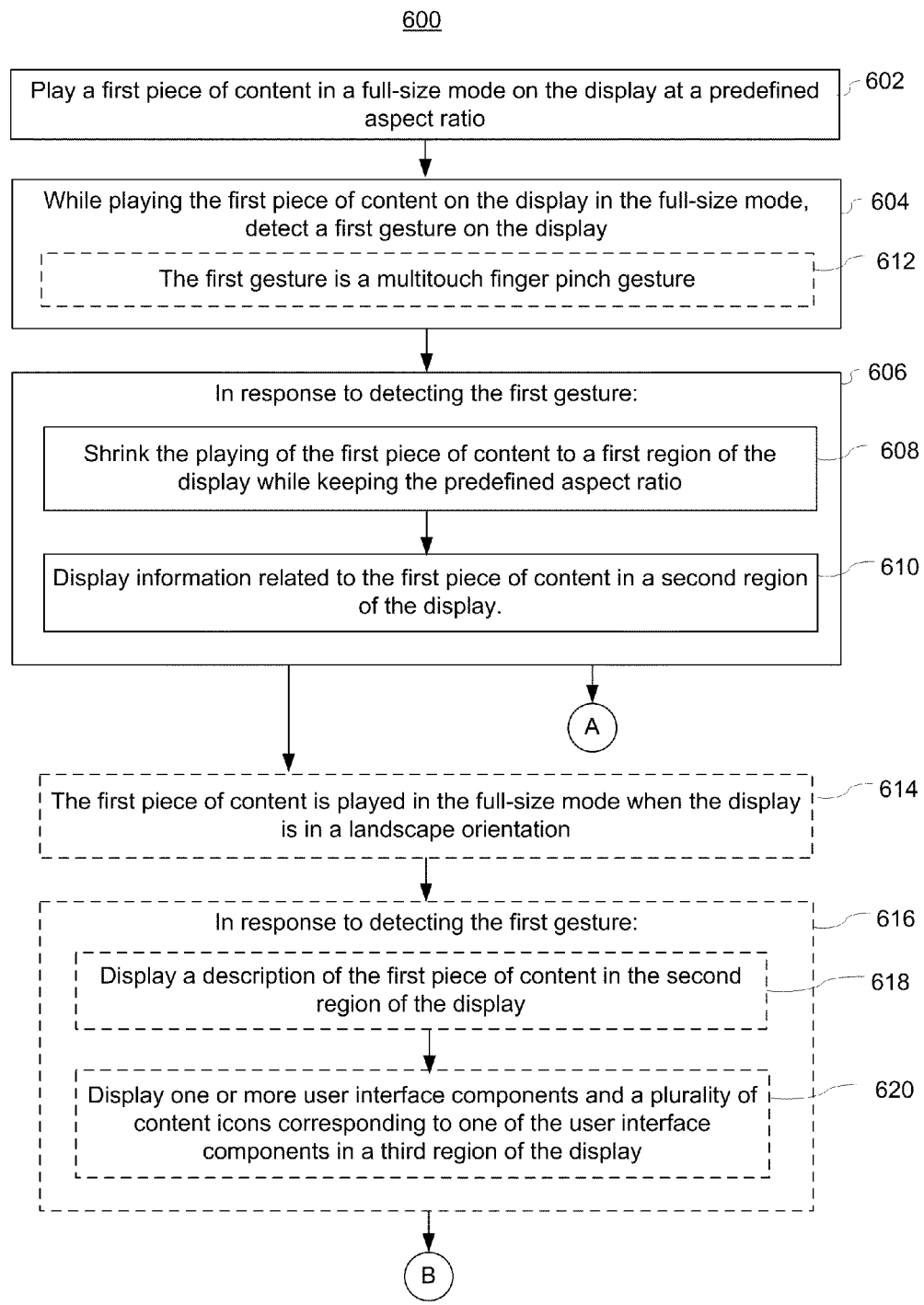
FIGS. 6A-6E are flow diagrams illustrating a method of manipulating user interface objects in accordance with some embodiments.
Figure 6B:
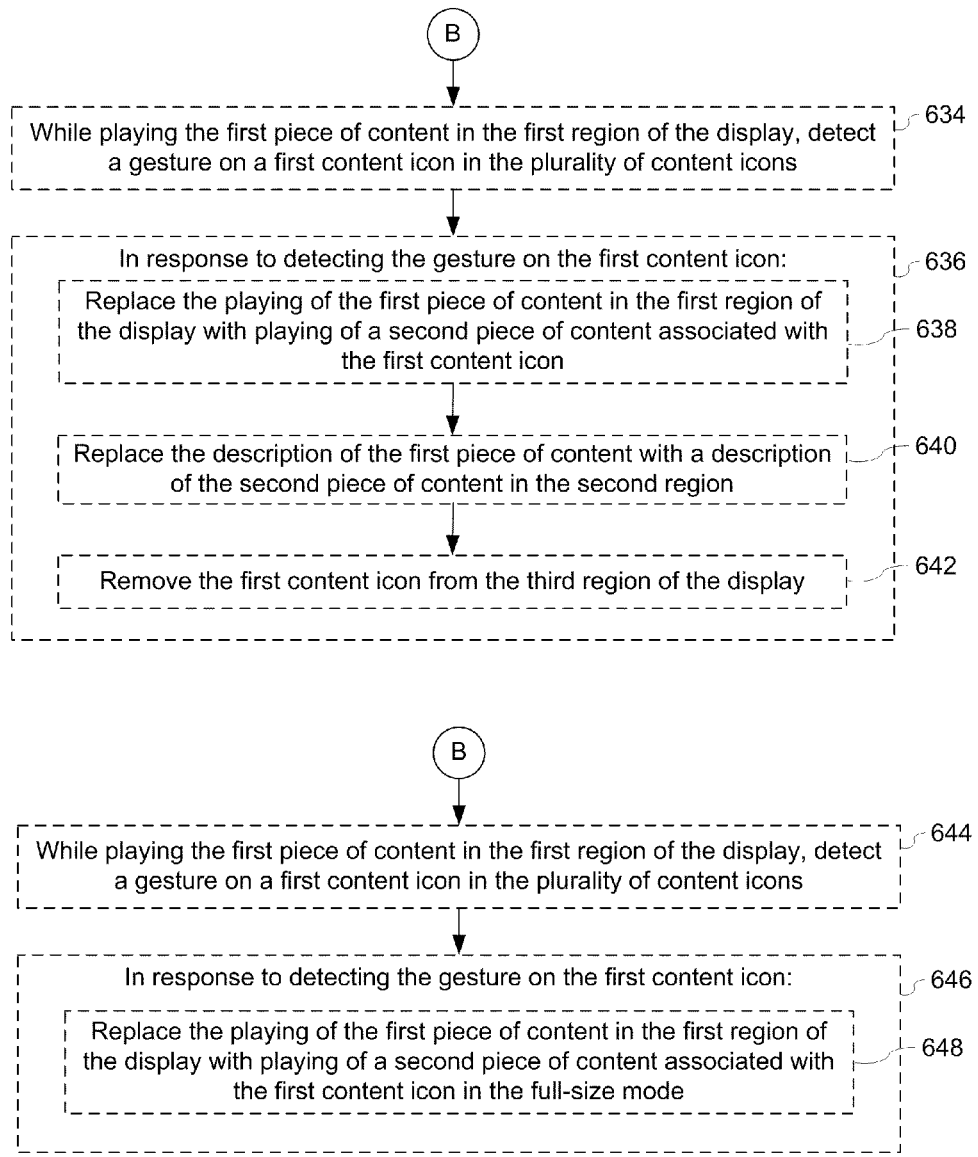
Figure 6C:
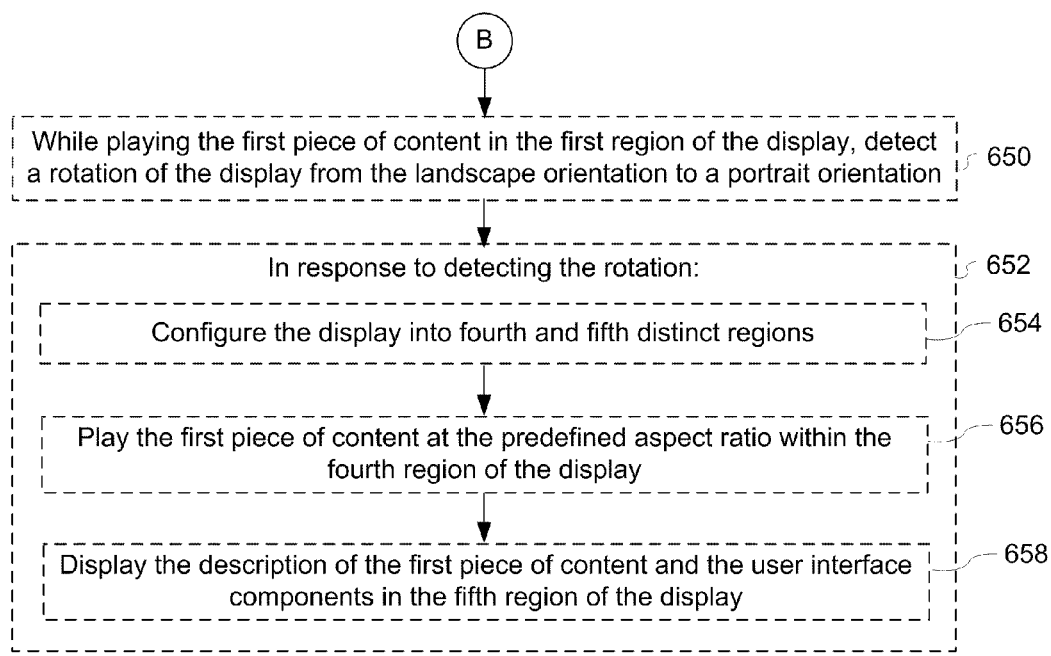
Figure 6D:
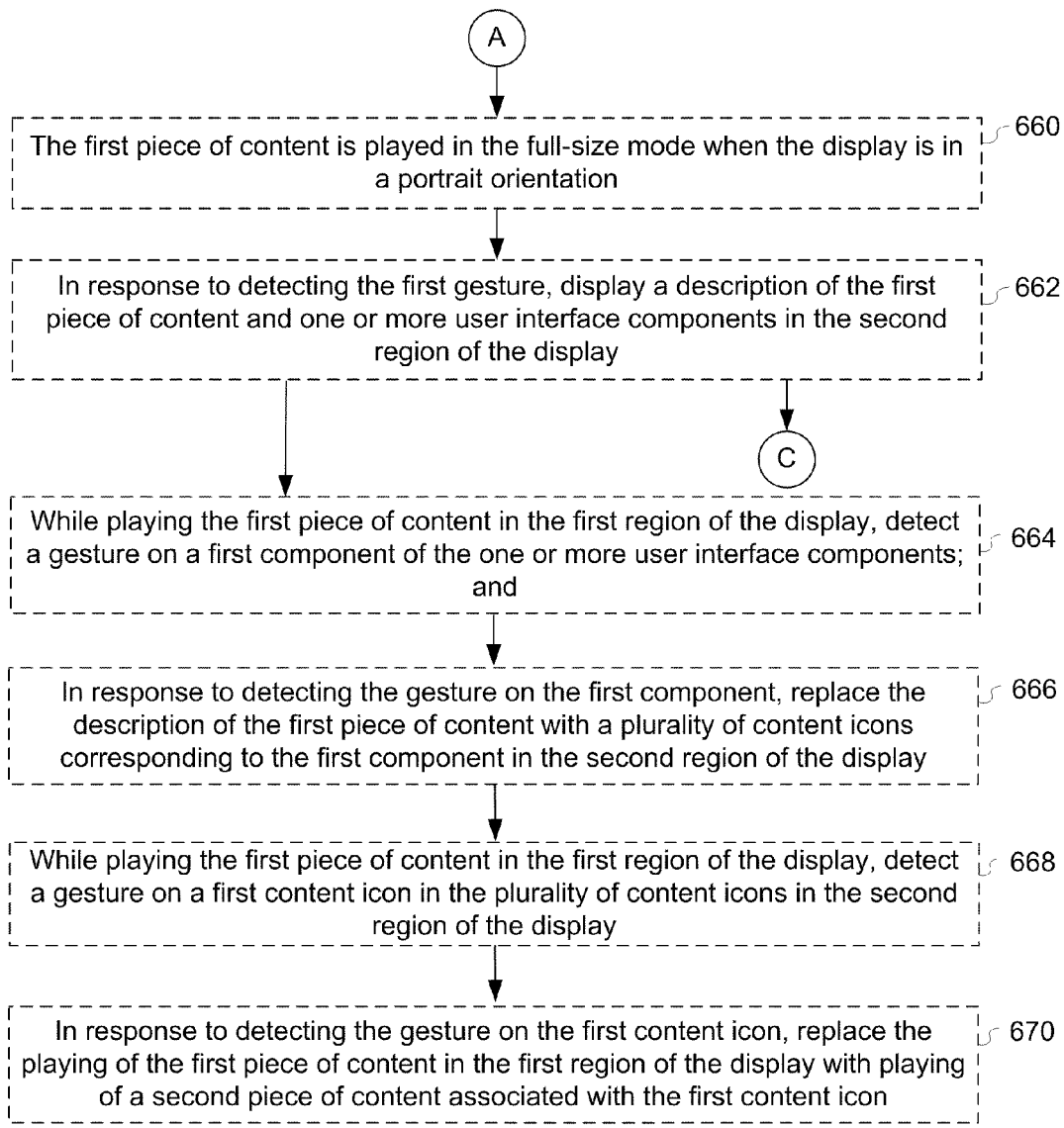
Figure 6E:
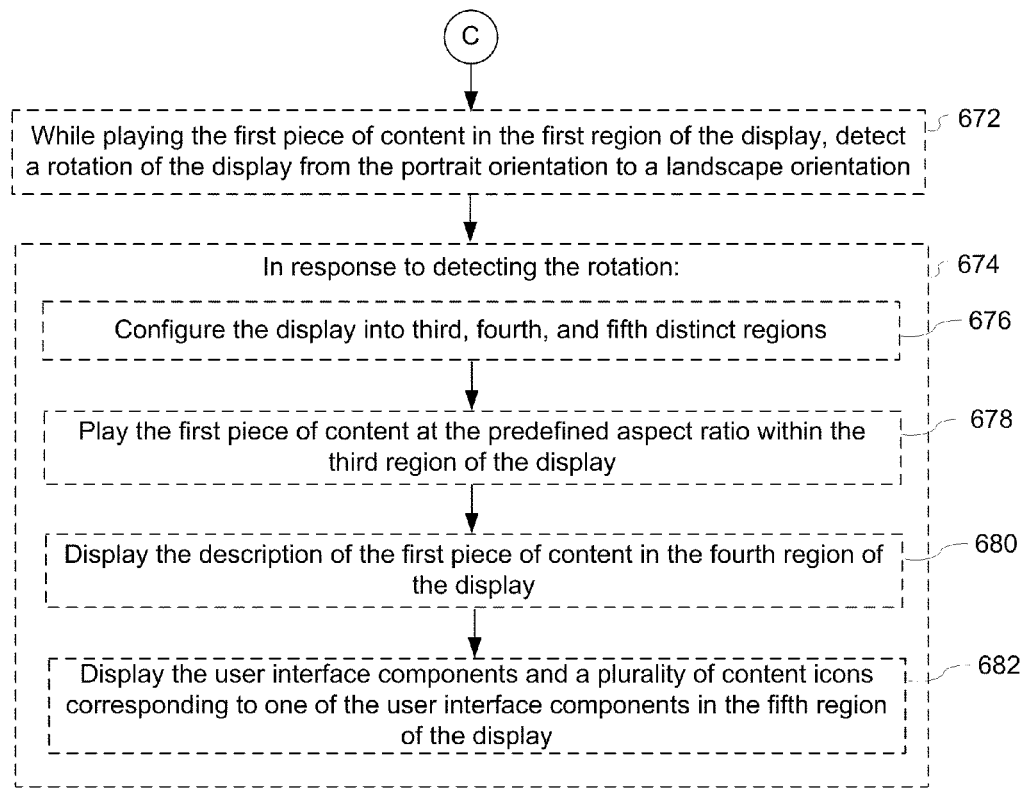

FIGS. 5A-5O illustrate exemplary user interfaces for manipulating user interface objects on a touch screen display in accordance with some embodiments. The user interfaces in these figures are used to illustrate the processes described below, including the processes in FIGS. 6A-6E.

In FIGS. 5A-5O, some finger contact movement sizes may be exaggerated for illustrative purposes. No depiction in the figures bearing on finger contact movements should be taken as a requirement or limitation for the purpose of understanding sizes and scale associated with the methods and devices disclosed herein.

FIG. 5A depicts an exemplary user interface including a 2-D (two-dimensional) array of user interface objects on touch screen 112. In this example, each user interface object (e.g., Video-1 to Video-12) represents a video stream remotely located at a website such as "YouTube" on the Internet. Additional information displayed adjacent to each video stream UI object includes a title of the video stream given by the author who uploads the video stream onto the website, a length of the video stream (e.g., in minutes and seconds), a number of views indicating how many times the video stream has been played by users visiting the website, a source of the video stream (e.g., the author's username registered at the website), one or more star icons indicating the rating of the video stream based on the users' feedback, etc.

In some embodiments, a server computer associated with the website classifies a plurality of video streams into multiple categories based on criteria such as "Featured," "Top Rated," "Most Viewed," Favorites," etc. In this example, each category has a corresponding touch-sensitive icon at the bottom of touch screen 112. A user selection of a particular icon (e.g., "Top Rated") causes the device to display a 2-D array of user interface objects representing video streams that fall into the corresponding category. The video streams (specifically, their associated user interface objects) are further divided into different sub-categories such as "Today," "This Week," or "All," indicating when a respective video stream was uploaded to the website. In this example, the 2-D array of video streams corresponds to the top-rated video streams that were uploaded to the website within "today."

In some embodiments, the device implements many features to facilitate user manipulation of the video streams through touch gestures on touch screen 112. For example, in response to a user selection (e.g., a finger contact 502) of the search box 504 at the top right corner of touch screen 112, a virtual or soft keyboard 506 appears on touch screen 112 (FIG. 5B). A user may enter one or more search terms into search box 504 through soft keyboard 506 to look for video streams that match the search terms. In response to a user selection of return key 510, one or more search results are displayed on touch screen 112 and soft keyboard 506 is no longer displayed on touch screen 112.

As another example, a user selection (e.g., a finger contact 508, FIG. 5B) of a user interface object "Video-6" activates the play of the corresponding video stream on the touch screen. FIG. 5C depicts that the video stream is played on touch screen 112 in the full-size mode, such that the other user interface objects and touch-sensitive icons are no longer displayed on touch screen 112. In this example, the touch screen is in a landscape orientation and the full-size mode of the video stream is also in the landscape orientation. In some embodiments, a user manipulation (e.g., a finger pinch gesture 512, FIG. 5C) of touch screen 112 transfers the video play from full-size mode to a composite mode as shown in FIG. 5D.

In the composite mode (shown in FIG. 5D), touch-sensitive icons corresponding to different categories of video streams re-appear at the bottom of touch screen 112 with the "Top Rated" icon being highlighted (to which category the video stream "Video-6" belongs). In some embodiments, another "Top Rated" touch-sensitive icon 514 appears at the top of touch screen 112. A user selection of icon 514 brings back the graphical user interface as shown in FIG. 5A. Other objects displayed near the top of touch screen 112 include the video stream's title 516 and the search box 504.

In some embodiments, the region of touch screen 112 that was used for displaying the 2-D array of user interface objects is divided into three sub-regions (522, 524, and 526). The video stream is played in sub-region 522. Note that although the display size of the video stream on the touch screen in the composite mode is reduced, its aspect ratio is substantially the same as the aspect ratio of the video stream display in the full-size mode. Sub-region 524 displays information related to the video stream in sub-region 522. In this example, the information includes the video stream's title, length, author, the number of views, and rating. In some embodiments, the information further includes a description of the video stream (e.g., a short paragraph of text describing the context of the video stream prepared by the author) that helps the viewers to understand the video stream.

In addition, sub-region 526 displays a list of user interface objects, each user interface object corresponding to a respective video stream related to the video stream currently displayed in sub-region 522. At the top of sub-region 526 are three touch-sensitive icons "Related" 528-1 (i.e., the highlighted one), "More From" 528-2, and "Comments" 528-3. In some embodiments, the related video streams are those video streams that cover the same subject as the video stream in the sub-region 522. The video streams associated with the "More From" icon 528-2 are video streams uploaded to the website by the same author. As described below in connection with FIG. 5G, a user selection of "Comments" icon 528-3 causes the display of comments about the video stream in sub-region 528-1 made by different viewers. In some embodiments, a finger tap on sub-region 524 or 526 of touch screen 112 causes the emergence of a scroll bar 529-1 or 529-2 in the same sub-region, indicating whether and how much additional information may appear in the sub-region in response to a finger swipe gesture.

Compared with the full-size mode, the composite mode provides more information about the currently-played video stream while reducing the video stream's display size, which provides a viewer a more holistic view of the video stream. Moreover, many user interface objects in the composite mode are touch-sensitive. As will be described below in connection with FIGS. 5E to 5H, a user manipulation of any touch-sensitive object can cause the device to render a new graphical user interface on touch screen 112. In particular, a predefined user manipulation (e.g., a finger de-pinch gesture 518) of the currently displayed video stream in the sub-region 522 causes the device to switch the graphical user interface from the composite mode back to the full-size mode as shown in FIG. 5C.

FIG. 5E depicts a graphical user interface in response to a user finger tap 520 of the user interface object "Video-2'" in FIG. 5D. Note that the video stream "Video-6" and its associated information is replaced with the video stream "Video-2'" and its associated information in the corresponding sub-regions 522 and 524. Additionally, the user interface object corresponding to the video stream "Video-2'" is eliminated from the sub-region 526. Finally, the "Top Rated" touch-sensitive icon 514 at the top left corner of touch screen 112 in FIG. 5D is replaced with a "Video-6" touch-sensitive icon 530, indicating that a user selection of the icon 530 will bring back the graphical user interface as shown in FIG. 5D.

FIG. 5F depicts a graphical user interface in response to a user selection (e.g., the finger tap 532, FIG. 5F) of the "More From" icon 528-2 in FIG. 5D. The list of user interface objects corresponding to the related video streams is now replaced with a list of user interface objects corresponding to video streams generated by the same author of the video stream "Video-6." A user selection of any of the user interface objects (e.g., a finger tap of the user interface object corresponding to the video stream "Video-4'" in FIG. 5F) can initiate a process of replacing the currently displayed video stream in the sub-region 522 with a video stream associated with the user-selected object, as described above in connection with FIG. 5E.

FIG. 5G depicts a graphical user interface in response to a user selection (e.g., finger tap 534, FIG. 5D) of the "Comments" icon 528-3 in FIG. 5D. In this case, the list of user interface objects corresponding to the related video streams is now replaced with a list of user interface objects corresponding to comments made by different viewers of the video stream "Video-6." A user of the device can add new comments by finger-tapping the "Add Comments" touch-sensitive icon 536.

FIG. 5H depicts a graphical user interface displayed by the device in response to rotation 537 (FIG. 5D) of the touch screen display from the landscape orientation as shown in FIG. 5D to a portrait orientation. Note that the graphical user interface after rotation is still in the composite mode. In this example, the user interface objects are also rotated by 90° and relocated on touch screen 112 in accordance with the portrait orientation. In some embodiments, some of the objects occupy substantially the same locations that they occupy in the landscape orientation of the composite mode user interface. For example, the touch-sensitive icons corresponding to different categories of video streams are located at the bottom of touch screen 112 in both the landscape orientation and portrait orientation. It is noted, however, that the "bottom" of the touch screen 112 is based on the current orientation of the device, and thus the bottom in one orientation is actually located at different region of touch screen 112 than the bottom in the other orientation. In addition, the "Top Rated" icon 514, the title 516, and the search box 504 are still located at the top of touch screen 112 in the portrait orientation. Nonetheless, switching between the portrait orientation and the landscape orientation causes re-grouping and relocation of some user interface objects. For example, in the landscape orientation of the user interface, the video stream description in the sub-region 524 of FIG. 5D is combined with the user interface objects in the sub-region 526. As a result, they appear together in the sub-region 544 of touch screen 112 in FIG. 5H. The video stream "Video-6" is played in the sub-region 540 of touch screen 112 in FIG. 5H.

In some embodiments, switching between the landscape orientation and the portrait orientation does not change the video stream display's aspect ratio. For example, if the aspect ratio is 16:9 (or 4:3) in the landscape orientation, it remains to be 16:9 (or 4:3) in the portrait orientation. In this case, a blank sub-region 542 may appear between the sub-region 540 and the sub-region 544.

In some embodiments, the graphical user interface in the composite mode (regardless of the display's orientation) includes a set of touch-sensitive user interface objects that support additional user manipulations of the currently displayed video stream (see, e.g., "Add" icon 538-1, "Share" icon 538-2, "Rate" icon 538-3, and "Flag" icon 538-4 in FIG. 5H). A detailed description of the icons and their associated processes is provided below in connection with FIGS. 5K to 5O.

In some embodiments, as shown in FIG. 5H, a predefined user manipulation (e.g., a finger de-pinch gesture 546) on sub-region 540 of touch screen 112 switches the graphical user interface from composite mode to full-size mode while the touch screen display is in the portrait orientation. FIG. 5I depicts one embodiment of the graphical user interface in full-size mode, in the portrait orientation. In this example, the video stream is played on the full screen, suggesting that the video's aspect ratio may be changed to fit into the full screen. FIG. 5J depicts another embodiment of the graphical user interface in the full-size mode. In this example, the display of the video stream occupies only a portion of touch screen 112, which is the maximum display size possible while maintaining the video's original aspect ratio. In either case, another predefined user manipulation (e.g., a finger pinch gesture 548 in either FIG. 5I or 5J) on the touch screen brings back the graphical user interface as shown in FIG. 5H.

FIG. 5K depicts that a user selection (e.g., a finger tap) of "Add" icon 538-1 (FIG. 5H) causes the display of "Favorites" icon 550 next to "Add" icon 538-1. In this example, a user selection of "Favorites" icon 550 categorizes the video stream "Video-6" to be one of the user's favorite video streams.

FIG. 5L depicts a graphical user interface displayed by the device in response to a user selection (e.g., a finger tap) of "Share" icon 538-2 (FIG. 5H). In this example, the graphical user interface includes an electronic message template that allows a user to recommend this video stream to others through a message including a URL 552 of the video stream.

FIG. 5M depicts that a user selection (e.g., a finger tap) of "Rate" icon 538-3 causes the device to display a "Rate" selection icon 554 or callout including five stars 556 next to "Rate" icon 538-3. In this example, a user can give the video stream a rating by selecting one or more of the five stars 556 in icon or callout 554, for example through the user of a finger swipe gesture.

FIGS. 5N and 5O depict that detecting user selection of a content icon (e.g., finger tap 545) in a second region 544 of the display while the device is in a portrait orientation causes the device to display the corresponding content in a first region 540 of the display.

FIGS. 6A-6E are flow diagrams illustrating a method 600 of manipulating user interface objects in accordance with some embodiments. Method 600 is performed at a portable multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, method 600 provides an intuitive way to manipulate user interface objects on the touch-sensitive display. The method reduces the cognitive burden on a user when manipulating user interface objects, thereby creating a more efficient human-machine interface. For battery-operated computing devices, enabling a user to manipulate user interface objects on the touch-sensitive display faster and more efficiently conserves power and increases the time between battery charges.

The device plays a first piece of content in a full-size mode on a touch-sensitive display at a predefined aspect ratio (602). In some embodiments, the first piece of content is a video (e.g., an online video such as a streamed video available at a website like "YouTube") as shown in FIG. 5C. In some other embodiments, the first piece of content is a slide show, or other visual presentation. In some embodiments, the full-size mode is a full-screen mode. In some embodiments, the full-size mode does not require that the visual presentation occupy the entire screen of the display. Rather, it is a display mode that displays the content using all (or substantially all) of the horizontal width of the display in its current orientation. For example, as shown in FIG. 5C, the horizontal width of the display corresponds to substantially the length of the longer side of the display when the display is in a landscape orientation. But as shown in FIGS. 5I and 5J, the horizontal width of the display corresponds to substantially the length of the shorter side of the display when the display is in a portrait orientation. In some embodiments, a visual presentation typically has a predefined aspect ratio for its image (which is typically defined as the image's width divided by its height). For example, two common videographic aspect ratios are 4:3 (1.33:1), universal for standard-definition video formats, and 16:9 (1.78:1), universal to high-definition television. In some embodiments, the device preserves the predefined aspect ratio of a visual presentation regardless of the display's physical orientation, which leaves some blank space on the display in some user interface modes (e.g., full-size mode in portrait orientation, as shown in FIG. 5J). In some other embodiments, the device causes the visual presentation to fill all the free space on the display regardless of the presentation's aspect ratio, which might distort the images of the visual presentation (FIG. 5I).

While playing the first piece of content on the display in the full-size mode, the device detects a first gesture on the display (604). As shown in FIG. 5C, in some embodiments, the first gesture is a two-finger pinch gesture 512 (612). In some other embodiments, the first gesture is a tap gesture with one or more taps or a multitouch gesture generated by a tool such as a stylus or the like. In response to detecting the first gesture (606), the device shrinks the playing of the first piece of content (video stream "Video-6" in FIG. 5C) to a first region (the sub-region 522 in FIG. 5D) of the display while keeping the predefined aspect ratio (608). In other words, there is no distortion to the images of the video stream "Video-6" when its size is reduced from the full-size mode in FIG. 5C to the composite mode in FIG. 5D. In some embodiments, this shrinking process is implemented through an animation of the first piece of content continuously reducing from its original size in FIG. 5C until it fits into the sub-region 522 in FIG. 5D. Moreover, the device also displays (610) information related to the first piece of content in a second region of the display (e.g., the video description in sub-region 524 in FIG. 5D or sub-region 544 in FIG. 5H). As shown in FIGS. 5D and 5H, the second region is separate from the first region.

In some embodiments (e.g., FIG. 5C), when the display is in a landscape orientation (614) the first piece of content is displayed in full-size mode. While in landscape mode, and playing first piece of content in full-size mode, the device responds to the first gesture (616) by displaying a description of the first piece of content (e.g., the video stream "Video-6") in the second region (e.g., the sub-region 524) of the display (618) and displays one or more user interface components (e.g., "Related" icon 528-1, "More From" icon 528-2, "Comments" icon 528-3 in FIG. 5D) and a plurality of content icons (e.g., the list of user interface objects "Video-1'" to "Video-4'") corresponding to one of the user interface components (e.g., the "Related" icon 528-1) in a third region (e.g., the sub-region 526) of the display (620). As shown in FIG. 5D, the three sub-regions 522, 524, and 526 are separate from each other.

In some embodiments, while playing the first piece of content (e.g., the video stream "Video-6") in the first region (e.g., the sub-region 522) of the display, the device detects a gesture (e.g., the finger tap gesture 520) on a first content icon (e.g., the user interface object corresponding to the video stream "Video-2'") in the plurality of content icons (634). In response to the gesture on the first content icon (636), the device replaces the playing of the first piece of content (e.g., the video stream "Video-6") in the first region of the display with playing of a second piece of content (e.g., the video stream "Video-2'" as shown in FIG. 5E) associated with the first content icon (638) and replaces the description of the first piece of content (e.g., the text in the sub-region 524 of FIG. 5D) with a description of the second piece of content (e.g., the text in the sub-region 524 of FIG. 5E) in the second region (640). In some embodiments, the device also removes the first content icon (e.g., the user interface object corresponding to the video stream "Video-2'") from the third region (e.g., the sub-region 526 of FIG. 5E) of the display (642). In this case, the device remains in the composite mode before and after replacing the content shown in the user interface.

In some embodiments, while playing the first piece of content (e.g., the video stream "Video-6") in the first region (e.g., the sub-region 522) of the display, the device detects a gesture (e.g., finger tap gesture 520, FIG. 5D) on a first content icon (e.g., the user interface object corresponding to the video stream "Video-2'") in the plurality of content icons (644). In response to the gesture on the first content icon (646), the device replaces the playing of the first piece of content (e.g., the video stream "Video-6") in the first region of the display with playing of a second piece of content (e.g., the video stream "Video-2'") associated with the first content icon in the full-size mode (648). For example, the play of the video stream "Video-2'" fills the entire screen, in an analogous manner to the display of "Video-6" in FIG. 5C.

In some embodiments, while playing the first piece of content (e.g., the video stream "Video-6") in the first region (e.g., the sub-region 522 in FIG. 5D) of the display, the device detects (650) a rotation of the display from the landscape orientation (e.g., the device orientation as shown in FIG. 5D) to a portrait orientation (e.g., the device orientation as shown in FIG. 5H) using, e.g., one or more accelerometers 168 shown in FIG. 1. In response to detecting the rotation (652), the device configures (654) the display into fourth and fifth distinct regions (e.g., the sub-regions 540 and 544 in FIG. 5H) that are separate from each other. In some embodiments, the device plays (656) the first piece of content (e.g., the video stream "Video-6") at the predefined aspect ratio within the fourth region (e.g., the sub-region 540) of the display and displays (658) a description of the first piece of content (e.g., the description of the video stream "Video-6") and the user interface components (e.g., the "Info," "Related," "More From," "Comments" icons) in the fifth region (e.g., the sub-region 544) of the display.

In some embodiments, when the display is rotated from a landscape orientation to a portrait orientation, the predefined first, second, and third regions displayed in the landscape orientation (e.g., the sub-regions 522, 524, and 526 in FIG. 5D) are transformed or replaced by the predefined fourth and fifth regions (e.g., the sub-regions 540 and 544 in FIG. 5H) in the portrait orientation. In some embodiments, the description of the first piece of content in the second region (e.g., the sub-region 524 in FIG. 5D) and the user interface components in the third region (e.g., the sub-region 526 in FIG. 5D) in the landscape orientation are merged and displayed together in the fifth region (e.g., the sub-region 544 in FIG. 5H) in the portrait orientation. In some embodiments, both transformation and merging operations are implemented through an animation process. A more detailed description of this animation process can be found in U.S. patent application Ser. No. 12/473,846, "Rotation Smoothing of a User Interface" (filed May 28, 2009), which is hereby incorporated by reference in its entirety.

In some embodiments, the first piece of content (e.g., the video stream "Video-6") is played (660) in the full-size mode when the display is in a portrait orientation (e.g., the video stream "Video-6" in FIG. 5I or 5J). As described above, playing content in the full-size mode does not necessarily fill the entire screen of the display. While in full-size mode, the device responds to detecting the first gesture (e.g., the two-finger pinch gesture 548 in FIG. 5I or 5J), by displaying a description of the first piece of content (e.g., the description of the video stream "Video-6") and one or more user interface components (e.g., the "Info," "Related," "More From," "Comments" icons) in the second region (e.g., the sub-region 544 in FIG. 5K) of the display (662).

In some embodiments, while playing the first piece of content (e.g., the video stream "Video-6") in the first region (e.g., the sub-region 540) of the display, the device detects (664) a gesture (e.g., a finger tap gesture 543 with one or more taps, FIG. 5K) on a first component (e.g., the "Related" icon) of the one or more user interface components. In response to detecting the gesture on the first component, the device replaces (666) the description of the first piece of content with a plurality of content icons (e.g., the user interface objects in FIG. 5N) corresponding to the first component (e.g., the "Related" icon) in the second region of the display.

In some embodiments, while playing the first piece of content in the first region of the display, the device detects (668) a gesture on a first content icon in the plurality of content icons in the second region of the display (e.g., the finger tap 545 on the user interface object "Video-5'", FIG. 5N). In response to detecting the gesture on the first content icon, the device replaces (670) the playing of the first piece of content (e.g., the video stream "Video-6") in the first region (e.g., sub-region 540 in FIG. 5O) of the display with playing of a second piece of content (e.g., the video stream "Video-5'") associated with the first content icon.

In some embodiments, while playing the first piece of content (e.g., the video stream "Video-6") in the first region (e.g., the sub-region 540 in FIG. 5H) of the display, the device detects (672) a rotation of the display from the portrait orientation to a landscape orientation using, for example, one or more accelerometers 168 shown in FIG. 1. In response to detecting the rotation (674), the device configures (676) the display into third, fourth and fifth distinct regions (e.g., the sub-regions 522, 524, and 526 in FIG. 5D that are separate from each other). In some embodiments, the device plays (678) the first piece of content (e.g., the video stream "Video-6") at the predefined aspect ratio within the third region (e.g., the sub-region 522) of the display and displays (680) the description of the first piece of content (e.g., the description of the video stream "Video-6") in the fourth region of the display (e.g., the sub-region 524) and the user interface components (e.g., the "Related," "More From," "Comments" icons) and a plurality of content icons corresponding to one of the user interface objects in the fifth region (e.g., the sub-region 526) of the display (682). In some embodiments, when the display is rotated from a portrait orientation to a landscape orientation, predefined first and second regions displayed in the portrait orientation are transformed or replaced by predefined third, fourth, and fifth regions in the landscape orientation.

In some embodiments, in response to detecting a rotation of the display from the portrait orientation to the landscape orientation, the device starts playing (or continues playing) the currently selected piece of content in full-size mode in the landscape orientation.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

For example, the operations depicted in FIGS. 6A-6E may be implemented by components depicted in FIGS. 1A-1C. For example, detection of the first gesture (604) may be implemented by event sorter 170, event recognizer 180, and event handler 190. Event monitor 171 in event sorter 170 detects the first gesture on a touch-sensitive display 112, and event dispatcher module 174 delivers the event information to application 136-1. In this case, application 136-1 includes methods and graphical user-interfaces for playing multimedia content, and displaying information about various pieces of content. A respective event recognizer 180 of application 136-1 compares the event information to respective event definitions 186, and determines whether particular gestures have been performed. When the predefined event or sub-event is detected, event recognizer 180 activates an event handler 180 associated with the detection of a respective gesture. Event handler 180 may utilize or call data updater 176 or object updater 177 to update data or a text display region and the application internal state 192. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a multifunction device with a touch-sensitive display:
playing a first piece of video content in a full-size mode on the display at a predefined aspect ratio, wherein the first piece of video content is a continuous sequence of moving images;
while playing the first piece of video content on the display in the full-size mode, detecting a first gesture on the display; and
in response to detecting the first gesture:
shrinking the playing of the first piece of video content to a first region of the display while keeping the predefined aspect ratio;
continuing to play the first piece of video content in the first region at the predefined aspect ratio; and
displaying information about the first piece of video content in a second region of the display, and
while in a portrait orientation, in response to detecting a rotation of the display from the portrait orientation to a landscape orientation, playing or continuing to play the first piece of video content in a full size mode in the landscape orientation.

2. The method of claim 1, wherein the first piece of video content is played in the full-size mode when the display is in a landscape orientation, including:
in response to detecting the first gesture:
displaying a description of the first piece of video content in the second region of the display; and
displaying one or more user interface components and a plurality of video content icons corresponding to the one of the user interface components in a third region of the display.

3. The method of claim 2, including:
while playing the first piece of video content in the first region of the display, detecting a gesture on a first video content icon in the plurality of video content icons; and
in response to detecting the gesture on the first video content icon:
replacing the playing of the first piece of video content in the first region of the display with playing of a second piece of video content associated with the first video content icon; and
replacing the description of the first piece of video content with a description of the second piece of video content in the second region.

4. The method of claim 2, including:
while playing the first piece of video content in the first region of the display, detecting a gesture on a first video content icon in the plurality of video content icons; and
in response to detecting the gesture on the first video content icon, replacing the playing of the first piece of video content in the first region of the display with playing of a second piece of video content associated with the first video content icon in the full-size mode.

5. The method of claim 2, including:
while playing the first piece of video content in the first region of the display, detecting a rotation of the display from the landscape orientation to a portrait orientation;
in response to detecting the rotation:
configuring the display into fourth and fifth distinct regions;
playing the first piece of video content at the predefined aspect ratio within the fourth region of the display; and
displaying the description of the first piece of video content and the user interface components in the fifth region of the display.

6. The method of claim 1, wherein the first piece of video content is played in the full-size mode when the display is in a portrait orientation, including:
in response to detecting the first gesture, displaying a description of the first piece of video content and one or more user interface components in the second region of the display.

7. The method of claim 6, including:
while playing the first piece of video content in the first region of the display, detecting a gesture on a first component of the one or more user interface components; and
in response to detecting the gesture on the first component, replacing the description of the first piece of video content with a plurality of video content icons corresponding to the first component in the second region of the display.

8. The method of claim 7, including:
while playing the first piece of video content in the first region of the display, detecting a gesture on a first video content icon in the plurality of video content icons in the second region of the display; and
in response to detecting the gesture on the first video content icon, replacing the playing of the first piece of video content in the first region of the display with playing of a second piece of video content associated with the first video content icon.

9. The method of claim 6, including:
while playing the first piece of video content in the first region of the display, detecting a rotation of the display from the portrait orientation to a landscape orientation; and
in response to detecting the rotation:
configuring the display into third, fourth, and fifth distinct regions;
playing the first piece of video content at the predefined aspect ratio within the third region of the display;
displaying the description of the first piece of video content in the fourth region of the display; and
displaying the user interface components and a plurality of video content icons corresponding to the one of the user interface components in the fifth region of the display.

10. A portable multifunction device, comprising:
a touch-sensitive display;
one or more processors;

memory; and one or more programs, wherein the one or more programs are stored in the memory and configured to be executed by the one or more processors, the one or more programs including instructions for:

playing a first piece of video content in a full-size mode on the display at a predefined aspect ratio, wherein the first piece of video content is a continuous sequence of moving images;

while playing the first piece of video content on the display in the full-size mode, detecting a first gesture on the display; and in response to detecting the first gesture:
shrinking the playing of the first piece of video content to a first region of the display while keeping the predefined aspect ratio;
continuing to play the first piece of video content in the first region at the predefined aspect ratio; and
displaying information about the first piece of video content in a second region of the display, and
while in a portrait orientation, in response to detecting a rotation of the display from the portrait orientation to a landscape orientation, playing or continuing to play the first piece of video content in a full size mode in the landscape orientation.

11. The device of claim 10, wherein the first piece of video content is played in the full-size mode when the display is in a landscape orientation, including instructions for:
in response to detecting the first gesture:
displaying a description of the first piece of video content in the second region of the display; and
displaying one or more user interface components and a plurality of video content icons corresponding to the one of the user interface components in a third region of the display.

12. The device of claim 11, including instructions for:
while playing the first piece of video content in the first region of the display, detecting a gesture on a first video content icon in the plurality of video content icons; and
in response to detecting the gesture on the first video content icon:
replacing the playing of the first piece of video content in the first region of the display with playing of a second piece of video content associated with the first video content icon; and
replacing the description of the first piece of video content with a description of the second piece of video content in the second region.

13. The device of claim 11, including instructions for:
while playing the first piece of video content in the first region of the display, detecting a gesture on a first video content icon in the plurality of video content icons; and
in response to detecting the gesture on the first video content icon, replacing the playing of the first piece of video content in the first region of the display with playing of a second piece of video content associated with the first video content icon in the full-size mode.

14. The device of claim 11, including instructions for:
while playing the first piece of video content in the first region of the display, detecting a rotation of the display from the landscape orientation to a portrait orientation;
in response to detecting the rotation:
configuring the display into fourth and fifth distinct regions;
playing the first piece of video content at the predefined aspect ratio within the fourth region of the display; and displaying the description of the first piece of video content and the user interface components in the fifth region of the display.

15. The device of claim 10, wherein the first piece of video content is played in the full-size mode when the display is in a portrait orientation, including instructions for:
in response to detecting the first gesture, displaying a description of the first piece of video content and one or more user interface components in the second region of the display.

16. The device of claim 15, including instructions for:
while playing the first piece of video content in the first region of the display, detecting a gesture on a first component of the one or more user interface components; and
in response to detecting the gesture on the first component, replacing the description of the first piece of video content with a plurality of video content icons corresponding to the first component in the second region of the display.

17. The device of claim 16, including instructions for:
while playing the first piece of video content in the first region of the display, detecting a gesture on a first video content icon in the plurality of content icons in the second region of the display; and
in response to detecting the gesture on the first video content icon, replacing the playing of the first piece of video content in the first region of the display with playing of a second piece of video content associated with the first video content icon.

18. The device of claim 15, including instructions for:
while playing the first piece of video content in the first region of the display, detecting a rotation of the display from the portrait orientation to a landscape orientation; and
in response to detecting the rotation:
configuring the display into third, fourth, and fifth distinct regions;
playing the first piece of video content at the predefined aspect ratio within the third region of the display;
displaying the description of the first piece of video content in the fourth region of the display; and
displaying the user interface components and a plurality of video content icons corresponding to the one of the user interface components in the fifth region of the display.

19. A non-transitory computer readable storage medium storing one or more programs, the one or more programs comprising instructions, which when executed by a portable multifunction device with a touch-sensitive display, cause the device to:
play a first piece of video content in a full-size mode on the display at a predefined aspect ratio, wherein the first piece of video content is a continuous sequence of moving images;
detect a first gesture on the display while playing the first piece of video content on the display in the full-size mode; and
in response to detecting the first gesture:
shrink the playing of the first piece of video content to a first region of the display while keeping the predefined aspect ratio;
continuing to play the first piece of video content in the first region at the predefined aspect ratio; and
display information about the first piece of video content in a second region of the display, and while in a portrait orientation, in response to detecting a rotation of the display from the portrait orientation to a landscape orientation, play or continue to play the first piece of video content in a full size mode in the landscape orientation.

20. The non-transitory computer readable storage medium of claim 19, wherein the first piece of video content is played in the full-size mode when the display is in a landscape orientation, including instructions that cause the device to:
in response to detecting the first gesture:
display a description of the first piece of video content in the second region of the display; and
display one or more user interface components and a plurality of video content icons corresponding to the one of the user interface components in a third region of the display.

21. The non-transitory computer readable storage medium of claim 20, including instructions that cause the device to:
while playing the first piece of video content in the first region of the display, detect a gesture on a first video content icon in the plurality of video content icons; and
in response to detecting the gesture on the first video content icon:
replace the playing of the first piece of video content in the first region of the display with playing of a second piece of video content associated with the first video content icon; and
replace the description of the first piece of video content with a description of the second piece of video content in the second region.

22. The non-transitory computer readable storage medium of claim 20, including instructions that cause the device to:
while playing the first piece of video content in the first region of the display, detect a gesture on a first video content icon in the plurality of video content icons; and
in response to detecting the gesture on the first video content icon, replace the playing of the first piece of video content in the first region of the display with playing of a second piece of video content associated with the first video content icon in the full-size mode.

23. The non-transitory computer readable storage medium of claim 20, including instructions that cause the device to:
while playing the first piece of video content in the first region of the display, detect a rotation of the display from the landscape orientation to a portrait orientation;
in response to detecting the rotation:
configure the display into fourth and fifth distinct regions;
play the first piece of video content at the predefined aspect ratio within the fourth region of the display; and
display the description of the first piece of video content and the user interface components in the fifth region of the display.

24. The non-transitory computer readable storage medium of claim 19, wherein the first piece of video content is played in the full-size mode when the display is in a portrait orientation, including instructions that cause the device to:
in response to detecting the first gesture, display a description of the first piece of video content and one or more user interface components in the second region of the display.

25. The non-transitory computer readable storage medium of claim 24, including instructions that cause the device to:
while playing the first piece of video content in the first region of the display, detect a gesture on a first component of the one or more user interface components; and
in response to detecting the gesture on the first component, replace the description of the first piece of video content with a plurality of video content icons corresponding to the first component in the second region of the display.

26. The non-transitory computer readable storage medium of claim 25, including instructions that cause the device to:
while playing the first piece of video content in the first region of the display, detect a gesture on a first video content icon in the plurality of video content icons in the second region of the display; and
in response to detecting the gesture on the first video content icon, replace the playing of the first piece of video content in the first region of the display with playing of a second piece of video content associated with the first video content icon.

27. The non-transitory computer readable storage medium of claim 24, including instructions that cause the device to:
while playing the first piece of video content in the first region of the display, detect a rotation of the display from the portrait orientation to a landscape orientation; and
in response to detecting the rotation:
configure the display into third, fourth, and fifth distinct regions;
play the first piece of video content at the predefined aspect ratio within the third region of the display;
display the description of the first piece of video content in the fourth region of the display; and
display the user interface components and a plurality of video content icons corresponding to the one of the user interface components in the fifth region of the display.

* * * * *

UNITED STATES PATENT AND TRADEMARK OFFICE
CERTIFICATE OF CORRECTION

PATENT NO. : 8,736,561 B2
APPLICATION NO. : 12/789427
DATED : May 27, 2014
INVENTOR(S) : Freddy Allen Anzures et al.

It is certified that error appears in the above-identified patent and that said Letters Patent is hereby corrected as shown below:

On the Title Page, References Cited

On page 3, in column 2, under "Other Publications", line 27, delete "Apr. 7," and insert -- Apr. 27, --, therefor.

On page 3, in column 2, under "Other Publications", line 44, delete "®" and insert -- © --, therefor.

On page 3, in column 2, under "Other Publications", line 47, delete "Ciipping:" and insert -- Clipping: --, therefor.

On page 3, in column 2, under "Other Publications", line 65, delete "MacNewsWorid," and insert -- MacNewsWorld, --, therefor.

On page 3, in column 2, under "Other Publications", line 67, delete "®," and insert -- © --, therefor.

On page 4, in column 1, under "Other Publications", line 23, delete "IvensSense," and insert -- , INvenSense, --, therefor.

On page 4, in column 1, under "Other Publications", line 33-34, delete "Copyright®" and insert -- Copyright© --, therefor.

On page 4, in column 2, under "Other Publications", line 1, delete ""iTunesInlineVideo,"" and insert -- "iTunesOnlineVideo," --, therefor.

On page 4, in column 2, under "Other Publications", line 45, delete "Raman, S. et al.," and insert -- Raman, B. et al., --, therefor.

On page 4, in column 2, under "Other Publications", line 69, delete "www.w3sschools." and insert -- www.w3schools. --, therefor.

On page 5, in column 1, under "Other Publications", line 4, delete "www.w3schoois." and insert -- www.w3schools. --, therefor.

On page 5, in column 1, under "Other Publications", line 17, delete "documention," and insert -- documentation, --, therefor.

Signed and Sealed this
Eleventh Day of November, 2014

Michelle K. Lee
*Deputy Director of the United States Patent and Trademark Office*

CERTIFICATE OF CORRECTION (continued)
U.S. Pat. No. 8,736,561 B2

On page 5, in column 1, under "Other Publications", line 19, delete "webmastetworld." and insert -- webmasterworld. --, therefor.